United States Patent
Yoshida

(10) Patent No.: US 8,015,322 B2
(45) Date of Patent: Sep. 6, 2011

(54) INFORMATION-PROCESSING SYSTEM, ELECTRONIC APPARATUS, INFORMATION-PROCESSING METHOD, AND COMPUTER-READABLE PROGRAM AND RECORDING MEDIUM

(75) Inventor: Tsuyoshi Yoshida, Tokyo (JP)

(73) Assignee: Sony Corporation, Tokyo (JP)

( * ) Notice: Subject to any disclaimer, the term of this patent is extended or adjusted under 35 U.S.C. 154(b) by 1245 days.

(21) Appl. No.: 11/222,649

(22) Filed: Sep. 9, 2005

(65) Prior Publication Data

US 2006/0064599 A1    Mar. 23, 2006

(30) Foreign Application Priority Data

Sep. 10, 2004    (JP) ................ P2004-264261

(51) Int. Cl.
*G06F 3/00* (2006.01)
(52) U.S. Cl. ............................. 710/19; 710/8
(58) Field of Classification Search ............ 710/19
See application file for complete search history.

(56) References Cited

U.S. PATENT DOCUMENTS

| | | | | | |
|---|---|---|---|---|---|
| 5,774,667 | A | * | 6/1998 | Garvey et al. ............... | 709/222 |
| 5,999,213 | A | * | 12/1999 | Tsushima et al. ............. | 348/180 |
| 6,035,120 | A | * | 3/2000 | Ravichandran ............... | 717/141 |
| 6,046,742 | A | * | 4/2000 | Chari ........................... | 715/734 |
| 6,239,836 | B1 | * | 5/2001 | Suzuki et al. ............... | 348/211.3 |
| 6,400,411 | B1 | * | 6/2002 | Bayes et al. ................. | 348/572 |
| 6,449,715 | B1 | * | 9/2002 | Krivoshein ................... | 713/1 |
| 6,572,475 | B1 | * | 6/2003 | Okabe et al. ................. | 463/30 |
| 6,587,911 | B1 | * | 7/2003 | Kawamura et al. .......... | 710/315 |
| 6,891,566 | B2 | * | 5/2005 | Marchese ..................... | 348/211.3 |
| 2004/0230985 | A1 | * | 11/2004 | Pfeifer .......................... | 719/313 |

FOREIGN PATENT DOCUMENTS

| | | |
|---|---|---|
| JP | 2001 175625 | 6/2001 |
| JP | 2002 124456 | 4/2002 |

\* cited by examiner

*Primary Examiner* — Henry Tsai
*Assistant Examiner* — Eric T Oberly
(74) *Attorney, Agent, or Firm* — Frommer Lawrence & Haug LLP; William S. Frommer; Paul A. Levy

(57) ABSTRACT

An information-processing system processes set-up identification information, which specifies a set-up item that is an adjustment attribute of a predetermined function of an electronic apparatus connectable to a network. The electronic apparatus that sets a parameter and the electronic apparatus on which the parameter is set are connected to each other. The electronic apparatus on which the parameter is set receives the set-up identification information from the electronic apparatus that sets the parameter. It also analyzes the set-up identification information thus received and converts the set-up identification information thus analyzed into set-up identification information of the electronic apparatus on which the parameter is set. It further changes a parameter setting of the electronic apparatus on which the parameter is set on the basis of adjustment contents of the set-up item correlated with the set-up identification information thus converted.

6 Claims, 15 Drawing Sheets

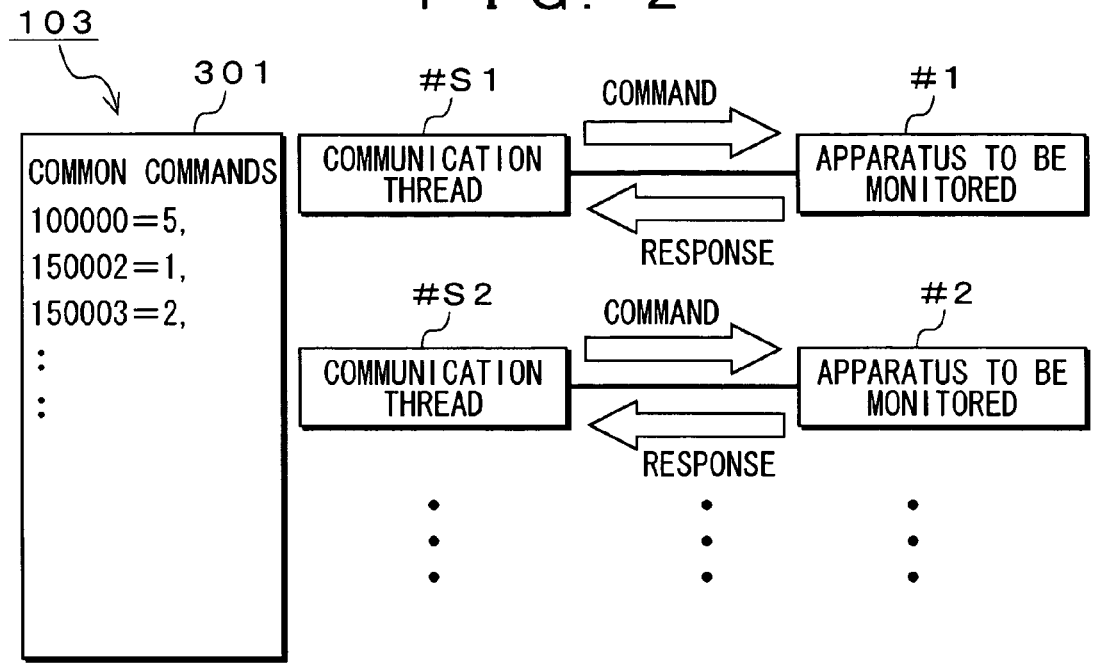
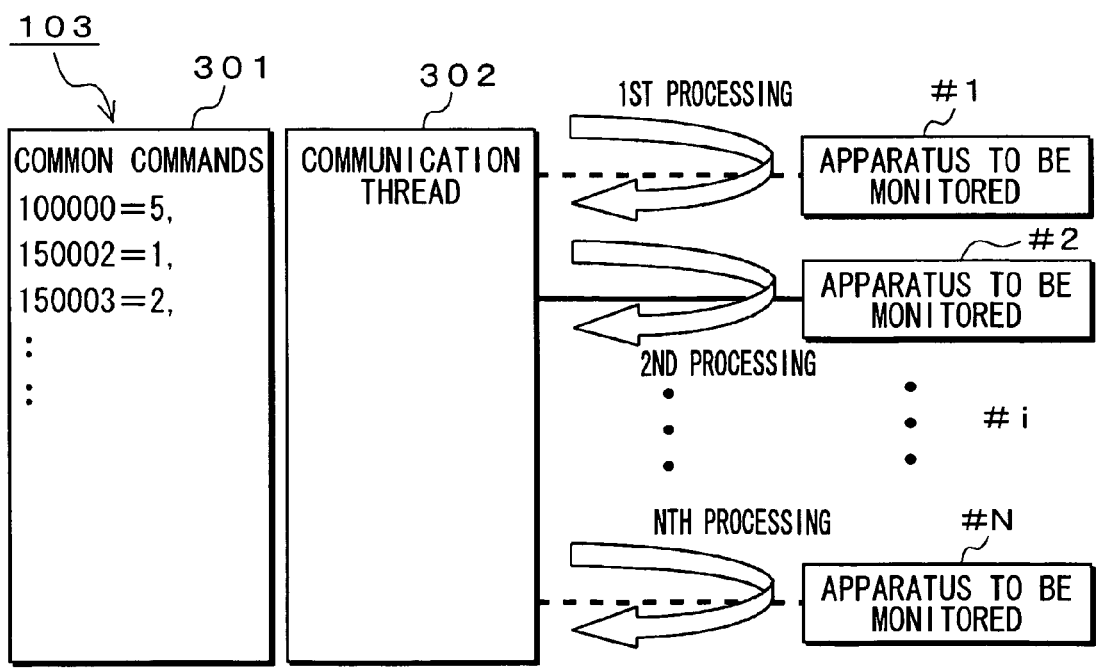

F I G. 9
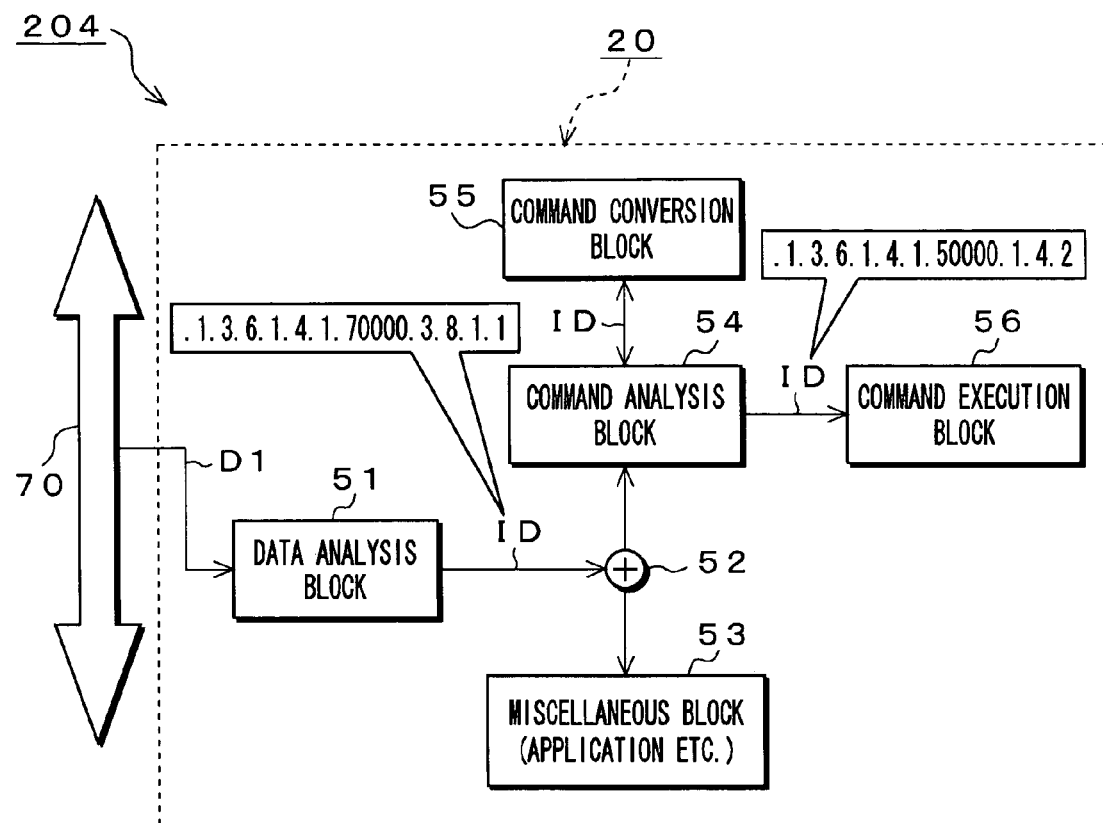

F I G. 1 6
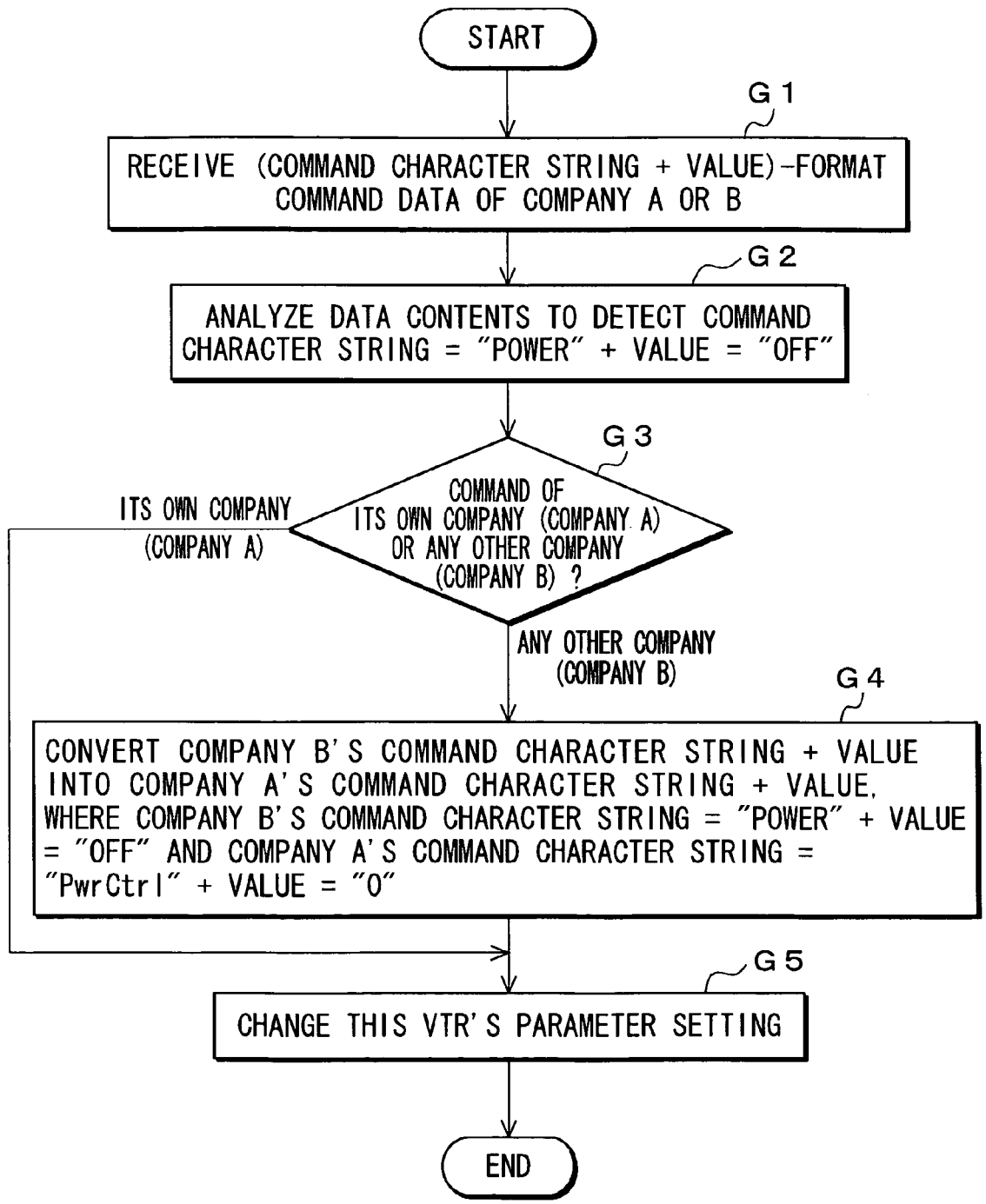

INFORMATION-PROCESSING SYSTEM, ELECTRONIC APPARATUS, INFORMATION-PROCESSING METHOD, AND COMPUTER-READABLE PROGRAM AND RECORDING MEDIUM

CROSS REFERENCE TO RELATED APPLICATIONS

The present invention contains subject matter related to Japanese Patent Application No. 2004-264261 filed in the Japanese Patent Office on Sep. 10, 2004, the entire contents of which being incorporated herein by reference.

BACKGROUND OF THE INVENTION

1. Field of the Invention

The present invention relates to an information-processing system, an electronic apparatus, an information processing method, and a computer-readable program and recording medium that could well be applied to a remote maintenance system etc. for remotely setting a parameter to an electronic apparatus that can be connected to a network.

2. Description of Related Art

In recent years, a large number of digital household goods, electrical appliances, and electrical goods are manufactured, sold, and installed everywhere including homes, public institutions, and civilian institutions. In such circumstances, environments that provide users with many convenient functions have been well improved.

There are many cases recently where, for example, a broadcast station may use electronic apparatuses such as a videotape recorder (VTR), a printer, a video camera, an IP camera, etc. in a condition where they are connected to a network such as the Internet or an LAN (the Ethernet).

Presently, many manufacturers sell their multifarious products having their own characteristics, so that it is quite common and not a rare case that various kinds of electronic apparatuses, software, etc. of these manufacturers may be incorporated as components to constitute one environment, system, etc.

There are many cases where a variety of hubs, routers, and bridges are employed in a mixed manner to constitute one network or where a variety of VTRs, editors, switchers, etc. of various manufacturers are mixed in a broadcast system, an edit system.

However, in return for these convenient functions thus provided, to develop such an environment that an individual person or a body of persons can utilize these functions to satisfy their demands, it is in most cases always necessary to change a large number of set-up parameters. To change the set-up parameters, various kinds of remote maintenance systems have been devised.

In conjunction with these kinds of remote maintenance systems, Japanese Patent Application Publication No. Hei 10-210164 discloses a remote maintenance scheme for a communication apparatus. According to this remote maintenance scheme, in remote management of a communication apparatus, a dial number of a sender is compared with a previously stored remote maintenance dial number and, if they match, a station line is captured without producing an incoming call sound, to interconnect a management apparatus at a remote maintenance center and a transmission/reception section of a communication apparatus of a relevant user. By thus constituting the maintenance scheme, it is possible to perform remote maintenance without troubling the user of the communication apparatus.

Further, in conjunction with an electronic apparatus connected to a network, Japanese Patent Application Publication No. 2001-344130 discloses a remote maintenance apparatus, a terminal connected to this apparatus, and a program and a recording medium for use in the remote maintenance processing. According to this remote maintenance apparatus, in acquiring configuration information from a terminal connected to the network upon occurrence of a failure, configuration information most recently acquired upon failure occurrence and that acquired upon previous failure occurrence are compared with each other, to extract differential information between the most recent configuration and the previous-generation configuration information. Based on this differential information, a cause of the failure is retrieved. By thus configuring a maintenance apparatus, it is possible to quickly search for the cause of a failure on a terminal connected to a network, thereby efficiently and effectively performing maintenance.

Furthermore, in conjunction with a remote maintenance system, Japanese Patent Application Publication No. 2000-305777 discloses a remote maintenance scheme for a communication apparatus. According to this remote maintenance scheme, to remote-manage a target device connected to a network, an instruction apparatus transmits via the Internet to the target device an e-mail that describes a command. The target device receives the e-mail and executes the command to perform setting and maintenance. By thus configuring the maintenance scheme, it is possible to realize remote maintenance that avoids setting a network environment.

Further, in conjunction with a remote maintenance system, Japanese Patent Application Publication No. 2004-164048 discloses a remote maintenance method and a remote maintenance apparatus. According to this remote maintenance method, a remote maintenance computer and a remote monitoring computer are connected to each other via communication means so that both of the computers may perform remote maintenance permission/refusal decision processing related to the remote maintenance, by which if both of them permit access, a changed program is downloaded from the remote maintenance computer to the remote monitoring computer. By thus configuring the maintenance method, it is possible to change the program safely and quickly.

SUMMARY OF THE INVENTION

However, the information-processing system, the electronic apparatus, the information-processing method, and the computer-readable program and recording medium that are related to the conventional embodiments have the following shortcomings.

i. When set-up parameters for devices to be monitored are changed, to meet desires of a user, some of the set-up parameters for each of the devices to be monitored are changed through a time-consuming job to some extent. However, to newly make up the same environment and the same setting for several tens or several hundreds of devices that are different from each other but similar to each other in function, it is necessary to perform time-consuming jobs of course, as well as a person in charge can make a mistake in setting owing to his or her human error, thus resulting in an inefficient and complicated management as a whole.

ii. In an environment and a system in which a plurality of devices of different types is used, to change a certain set-up item to the same set value, for example, to change domestic video signal schemes to the common "NTSC" or "PAL" in a broadcast station etc., an administrator therefor may have to go through target devices scattered on different racks in different rooms on different floors and open a set-up menu from a control panel thereof to find necessary items to be changed among many menu items and change a program therefor for each of the devices.

iii. Further, according to a target device that is designed a little well, a function (method) is supported for importing or exporting a group of set-up parameters by utilizing an external memory etc. By this method, if a plurality of devices of the same type is present in a network, a group of parameters that are set for one of the devices is converted into a dedicated file format, to be copied via the external memory or the network. However, by this method, as the number of devices to be managed increases, a larger number of persons may be necessary to finish a setting changing job in a short lapse of time, so that it is anticipated that the persons in charge of the job is more increased, the work for training them as the job procedure is more increased in proportion to their numbers.

iv. There are some cases where a dedicated remote set-up application (tool) is prepared for a certain type of devices, so that by activating the application, set-up parameters can be changed for a device having a specified IP address. However, if there are many devices to be monitored, it may be necessary to activate the application for each of the devices to be monitored (hereinafter also referred to as "electronic apparatuses") and change the corresponding set-up parameters according to the IP addresses, etc. that are assigned to these electronic apparatuses. Therefore, even in a case where the above Japanese patent publications are employed, if a plurality of devices to be connected is mixed, it may become necessary to install or activate a remote set-up application dedicated for each of the devices and, moreover, know about IP address information of all the connection destinations of these target devices.

In view of the above, it is desirable to provide an information-processing system, an electronic apparatus, an information-processing method, and a computer-readable program and recording medium that, in parameter setting processing for a plurality of electronic apparatuses connectable to a network, enable all the parameter settings of the plurality of electronic apparatuses to be changed to a common parameter setting at a time and the same set-up items of all the devices to easily set to the same value.

According to an embodiment of the present invention, there is provided an information-processing system that processes set-up identification information, which specifies a set-up item. The set-up item is an adjustment attribute of a predetermined function of an electronic apparatus connectable to a network. The electronic apparatus that sets a parameter and the electronic apparatus on which the parameter is set are connected to each other. The electronic apparatus on which the parameter ID is set receives the set-up identification information from the electronic apparatus that sets the parameter, analyzes the set-up identification information thus received, converts the set-up identification information thus analyzed into set-up identification information of the electronic apparatus on which the parameter is set, and changes a parameter setting of the electronic apparatus on which the parameter is set on the basis of adjustment contents of the set-up item correlated with the set-up identification information thus converted.

According to this information-processing system as an embodiment of the present invention, if the set-up identification information that specifies a set-up item, which is an adjustment attribute of a predetermined function of an electronic apparatus connectable to a network, is processed, an electronic apparatus which sets a parameter and an electronic apparatus or electronic apparatuses on which the parameter is set are first connected to each other, for example, via a network. The electronic apparatus or apparatuses on which the parameter is set then receive(s) the set-up identification information from the electronic apparatus which sets the parameter. It (they) analyze(s) the set-up identification information thus received, and converts this set-up identification information thus analyzed into set-up identification information of the electronic apparatus or apparatuses on which the parameter is set. It (they) also change(s) parameter setting(s) of the electronic apparatus or apparatuses on which the parameter is set on the basis of adjustment contents of the set-up item correlated with the set-up identification information thus converted.

It is thus possible to change all the parameter settings of a plurality of electronic apparatuses connected to the network to a common parameter setting at a time. Moreover, even if a type of the electronic apparatus which sets the parameter and a type of the electronic apparatus 1D or apparatuses on which the parameter is set are different from each other, it is possible to change all the parameters at a time, thereby easily setting the same set-up items of all the types of the apparatuses to the same value. It is thus possible for a person in charge of services or management to mitigate a job of going to a job site and managing and inspecting the electronic devices one by one and easily perform consolidated management and operation, thereby suppressing support costs on the job site.

Also, according to an embodiment of the present invention, there is provided an electronic apparatus which is connectable to another electronic apparatus that sets a parameter, via a network, and on which a parameter is set by enabling to be processed set-up identification information that specifies a set-up item. The set-up item is an adjustment attribute of a predetermined function of the electronic apparatus. The electronic apparatus has reception device that receives the set-up identification information from the electronic apparatus that sets the parameter, analysis device that analyzes the set-up identification information received from the reception device, conversion device that converts the set-up identification information analyzed by the analysis device into set-up identification information of this electronic apparatus, and changing device that changes a parameter setting of this electronic apparatus on the basis of adjustment contents of the set-up item correlated with the set-up identification information converted by the conversion device.

According to this electronic apparatus as an embodiment of the present invention, if the set-up identification information which specifies a set-up item that is adjustment attributes of a predetermined function, is processed, the reception device receives the set-up identification information from the electronic apparatus which sets the parameter. The analysis device analyzes the set-up identification information received by the reception device. Based on this assumption, conversion device converts the set-up identification information analyzed by the analysis device into set-up identification information of this apparatus, and changing device changes a parameter setting of the apparatus according to adjustment contents of the set-up item correlated with the set-up identification information thus converted.

Therefore, even if a type of an electronic apparatus that sets the parameter is different from that of this apparatus, it is possible to easily change the set-up parameter, thereby setting the same set-up item of each of the types of apparatuses to the same value. It is thus possible for a person in charge of services or management to mitigate a job of going to a job site and managing and inspecting the electronic apparatuses one by one.

Further, according to an embodiment of the present invention, there is provided an information-processing method for processing set-up identification information that specifies a set-up item. The set-up item is an adjustment attribute of a predetermined function of an electronic apparatus connectable to a network. The method includes the steps of connecting the electronic apparatus that sets a parameter and the electronic apparatus on which the parameter is set to each other, and receiving the set-up identification information from the electronic apparatus that sets the parameter, in the electronic apparatus on which the parameter is set. The method further includes the steps of analyzing the set-up identification information received in the electronic apparatus on which the parameter is set, converting the set-up identification information thus analyzed into set-up identification information of the electronic apparatus on which the parameter is set, and changing a parameter setting of the electronic apparatus on which the parameter is set on the basis of adjustment contents of the set-up item correlated with the set-up identification information thus converted.

According to the information-processing method as an embodiment of the present invention, in processing of the set-up identification information that specifies the set-up item(s) of the electronic apparatus or apparatuses connectable to a network, it is possible to change the parameter settings of all the electronic apparatuses connected to the network to a common parameter setting at a time. Moreover, even if a type of an electronic apparatus which sets the parameter(s) and a type of an electronic apparatus or each of the apparatuses on which the parameter(s) are set are different from each other, it is possible to change all the parameters at a time, thereby easily setting the same set-up items of all the types of apparatuses to the same value.

Additionally, according to an embodiment of the present invention, there is provided a computer-readable program for allowing an electronic apparatus on which a parameter is set to process set-up identification information that specifies a set-up item. The set-up item is an adjustment attribute of a predetermined function of the electronic apparatus on which the parameter is set. The program includes the steps of receiving the set-up identification information from the electronic apparatus that sets the parameter, and analyzing the set-up identification information thus received. The program also includes the steps of converting the set-up identification information thus analyzed into set-up identification information of the electronic apparatus on which the parameter is set, and changing a parameter setting of the electronic apparatus on which the parameter is set on the basis of adjustment contents of the set-up item correlated with the set-up identification information thus converted.

According to a computer-readable program as an embodiment of the ID present invention, it is possible to change the parameter settings of all the electronic apparatuses connected to the network to a common parameter setting at a time. Moreover, even if a type of an electronic apparatus which sets the parameter(s) and a type of an electronic apparatus or each of the apparatuses on which the parameter(s) is (are) set are different from each other, it is possible to change all the parameters at a time, thereby easily setting the same set-up item of all the types of the apparatuses to the same value.

Still further, according to an embodiment of the present invention, there is provided computer-readable recording medium for storing a program for allowing an electronic apparatus on which a parameter is set to process set-up identification information that specifies a set-up item. The set-up item is an adjustment attribute of a predetermined function of the electronic apparatus on which the parameter is set. The program includes the steps of receiving the set-up identification information from the electronic apparatus that sets the parameter, and analyzing the set-up identification information thus received. The program also includes the steps of converting the set-up identification information thus analyzed into set-up identification information of the electronic apparatus on which the parameter is set, and changing a parameter setting of the electronic apparatus on which the parameter is set on the basis of adjustment contents of the set-up item correlated with the set-up identification information thus converted.

According to the computer-readable recording medium as an embodiment of the present invention, it is possible to change the parameter settings of all the electronic apparatuses connected to the network to a common parameter setting at a time. Moreover, even if a type of an electronic apparatus which sets parameter(s) and a type of an electronic apparatus or each of the apparatuses on which the parameter(s) is (are) set are different from each other, it is possible to change all the parameters at a time, thereby easily setting the same set-up item of all the types of the apparatuses to the same value.

Thus, by the information-processing system, the information-processing method and the like as embodiments of the present invention, in processing of set-up identification information that specifies the set-up items of the electronic apparatuses connectable to the network, the set-up identification information received from an electronic apparatus which sets parameters is analyzed and converted into set-up identification information of an electronic apparatus or each of the apparatuses, so that according to the adjustment contents of set-up items correlated with the post-conversion set-up identification information, parameter settings of the electronic apparatuses on which the parameter(s) is (are) set may be changed.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 2 is a block diagram of a communication-processing example (No. 1) at the time of parameter-setting change in the remote maintenance system 1;

FIG. 3 is a block diagram of the communication-processing example (No. 2) at the time of the parameter-setting change in the remote maintenance system 1;

FIG. 9 is a diagram for showing a configuration (at the time of reception of OID) of the control block constituted in further embodiment of the control apparatus 20 according to the invention;

FIG. 16 is a flowchart of a parameter-setting example (command character string+VALUE).

DESCRIPTION OF THE PREFERRED EMBODIMENTS

The following will describe embodiments of an information-processing system, an electronic apparatus, an information-processing method, and a computer-readable program and recording medium that are related to the present invention, with reference to drawings.

Figure 1:
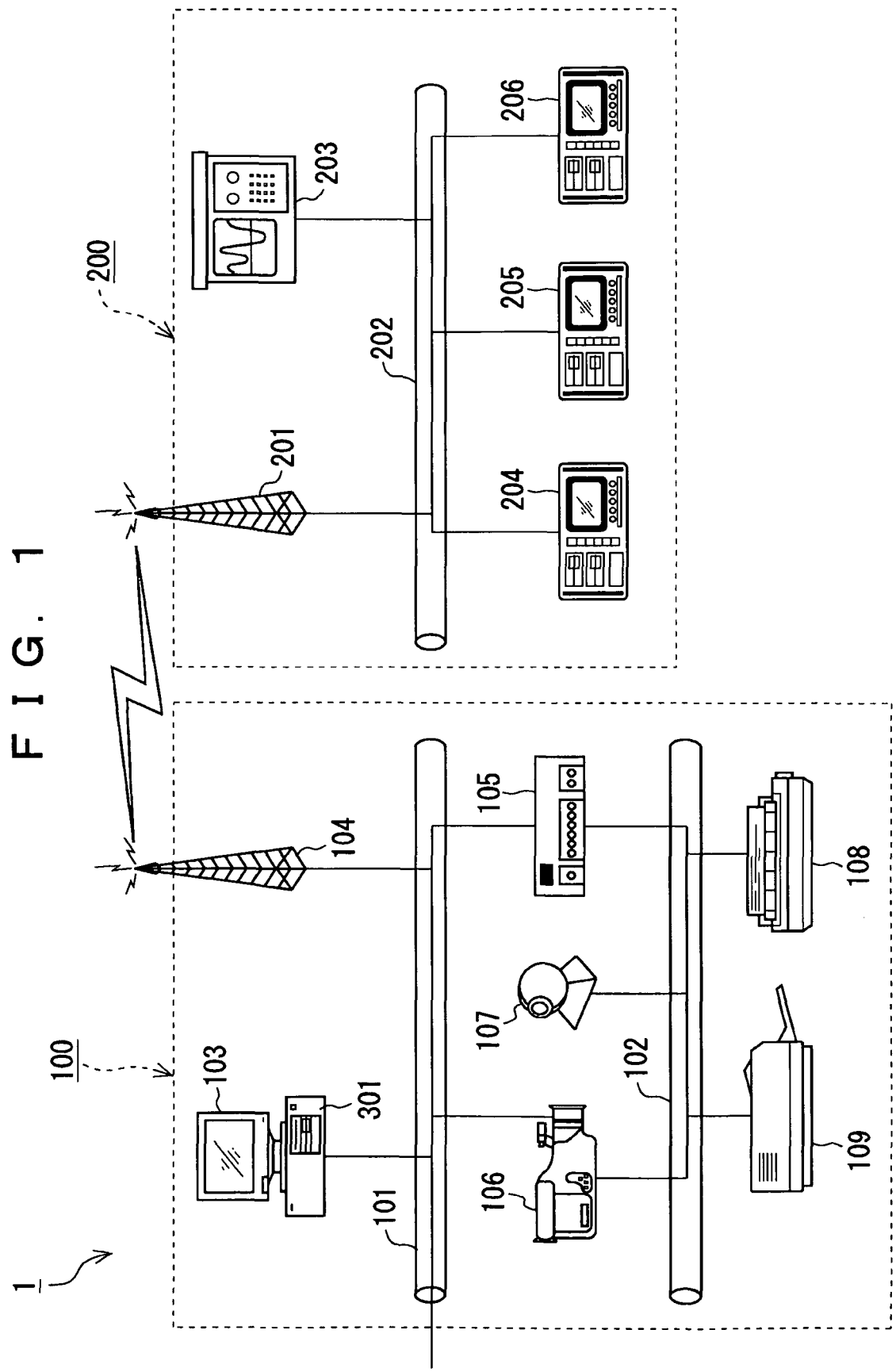
FIG. 1 is a conceptual diagram of a configuration of a remote maintenance system 1 to which each embodiment of an information-processing system related to the present invention is applied.

FIG. 1 is a conceptual diagram of a configuration of a remote maintenance system 1 to which each embodiment of an information-processing system related to the present invention is applied.

The remote maintenance system 1 shown in FIG. 1 processes set-up identification information (hereinafter referred to as "parameter identifier ID") that specifies a set-up item or set-up items of an electronic apparatus connectable to a network. In the present embodiment, in the remote maintenance system 1, an information management system 100 and a video-editing system 200 are placed under the control of parameter set-up remote management. Parameter, as referred to here, means variables (intervening variables) to adjust a function of an electronic apparatus. The parameter includes timer information for turn-ON/OFF of a power of a relevant electronic apparatus, function adjustment information for adjustment of functions of the electronic apparatus, and specification information for specification of set-up items of the electronic apparatus. The set-up item refers to an adjustment attribute of a predetermined function of an electronic apparatus correlated with a parameter identifier ID.

For example, if an electronic apparatus happens to be a video tape recorder (VTR), an editing facility, etc. equipped to a broadcast station etc., set-up items include a pre-roll time (PRE-ROLL TIME) that sets a cue point of time for video tape, a character H-position (CHARACTER H-POSITION) that sets a horizontal position of a video image, and a character V-position (CHARACTER V-POSITOIN) that sets a vertical position of the video image.

In the present embodiment, the information management system 100 has networks 101 and 102, a personal computer 103, an access point 104, a hub 105, a video camera 106, an IP camera 107, and printers 108 and 109.

The personal computer 103 is one example of an electronic apparatus that sets a parameter or parameters. The personal computer 103 constitutes a consolidated management apparatus (management station; SNMP manager) and has control software 301 that is necessary for remote maintenance. The control software 301 is a program that realizes a parameter set-up batch processing in a relationship of one consolidated remote management apparatus to many apparatuses to be monitored (SNMP agents). The control software 301 is stored in a computer readable recording medium. The program includes, for example, a step of receiving a parameter identifier ID from the personal computer 103 that sets parameters, a step of analyzing the received parameter identifier ID, a step of converting the analyzed parameter identifier ID into a parameter identifier ID of each of the apparatuses to be monitored, and a step of changing a parameter setting of each of the apparatuses to be monitored according to adjustment contents of the set-up item correlated with the post-conversion parameter identifier ID.

This program is written into a computer-readable CD-ROM and can be downloaded to the apparatuses to be monitored. This control software 301, thus, allows the parameter settings of multiple apparatuses to be monitored to be changed to a common parameter setting at a time. Moreover, even if a type of the apparatuses to be monitored placed under control of remote-management of the personal computer 103 that sets a parameter or parameters and that of the relevant apparatuses to be monitored are different from each other, it is possible to change all the parameters at a time, thereby easily setting the same set-up item or items of all the types to the same value.

The personal computer 103 is connected to the network 101 that constitutes communication means. The network 101 is connected to the network 102 via the hub 105 that constitutes a communication connection apparatus. To the network 102, the video camera 106, the IP camera 107, and the printers 108 and 109 are connected. The video camera 106, the IP camera 107, and the printers 108 and 109 are apparatuses to be monitored for remote maintenance. Each of these apparatuses to be monitored has an information conversion table, by which the parameter identifier ID of the personal computer 103 that sets the parameter(s) is converted into a parameter identifier ID of each of the apparatuses to be monitored.

The network 101 is also connected to the access point 104 that constitutes the communication means. The access point 104 of the information management system 100 performs wireless communication processing with an access point 201 of the video-editing system 200. Such communication means as the networks 101, 102, and 202, the access points 104 and 201, and the hub 105 is communication-enabled by the control software 301 when the parameter setting is changed. As the networks 101, 102, and 202, a TCP/IP network is used.

The video-editing system 200 is applied to a broadcast station etc. in a condition where a large number of video equipment units such as VTRs, editing facilities, and switchers are installed in a plurality of floors, an editing room, a rack room, etc. In the present embodiment, the network 202 is connected to the access point 201 of the video-editing system 200. To the network 202, for example, one oscilloscope 203 and three video tape recorders (hereinafter abbreviated as VTRs) 204 to 206 are connected. The oscilloscope 203 is used to observe waves when editing a video.

The VTRs 204 to 206 are one example of a reception side electronic apparatus on which the parameter(s) is (are) set. The VTRs 204 to 206 etc. may be of the same type or different types as a category; for example, there are many cases where the VTR of company A and that of company B may have different parameters.

Each of the VTRs 204 to 206 etc. receives a parameter identifier ID from the personal computer 103 that sets the parameter(s), analyzes the received parameter identifier ID, converts the analyzed parameter identifier ID into a parameter identifier ID of the relevant VTR (hereinafter referred to as "apparatus to be monitored" too), and changes a parameter setting of this VTR according to adjustment contents of the set-up item correlated with the post-conversion parameter identifier ID. Such the apparatus to be monitored as the VTRs 204 to 206 each have the information conversion table, by which a parameter identifier ID of the personal computer 103 that sets the parameter(s) is converted into a parameter identifier ID of a relevant apparatus to be monitored.

Further, such the apparatus to be monitored as the VTRs 204 to 206 each analyze the adjustment contents of the set-up item, convert the analyzed adjustment contents of the set-up item into adjustment contents of these VTRs 204 to 206, and change parameter setting of each of these VTRs 204 to 206 based on the post-conversion adjustment contents. The VTRs 204 to 206 are handled so that a video may be edited after the parameter setting is changed.

The following will enumerate and describe an example of a function to download a VTR setting parameter by using an interactive status reporting protocol (ISR) that conforms to a status monitoring and diagnostics protocol (SMDP), which the present inventor et al. suggest.

In the present embodiment, as a variable to adjust a certain function of the VTRs 204 to 206 etc., a parameter identifier ID is defined so that by specifying this parameter identifier ID, a parameter setting can be changed. In the present embodiment, to define the parameter identifier ID for adjusting the certain function, the following method is employed.

i. If apparatuses to be monitored are made by the same manufacturer and of the same category (each category such as projectors) but of different types, a different identifier ID is assigned to a different parameter that adjusts the same function.

ii. If apparatuses to be monitored are made by the same manufacturer and of the same category (VTR, switcher, etc.) and of the same type, the same identifier ID is assigned to parameters that make the same setting.

iii. A common identifier ID is assigned to parameters that specify a certain set-up item for all of the apparatuses that are made by the same manufacturer and of the same category. That is, if apparatuses to be monitored are of the same category, a common parameter identifier ID is assigned to set-up items that adjust the same function of these apparatuses to be monitored.

This embodiment of the present invention will function efficiently and effectively by employing the definition methods of the above items ii and iii. The VTRs 204 to 206 are compliant with the above item ii.

By employing the methods, the following excellent merits can be obtained.

i. No matter whether apparatuses are of the same type or not, a large number of various parameters can be identified uniquely by using an identifier ID.

ii. Even if apparatuses to be monitored are of different types, the same set-up items can be represented by the same identifier ID, so that it is possible to commonize application on the side of these apparatuses to be monitored.

iii. Even if apparatuses to be monitored are of different types, the same set-up items can be represented by the same identifier ID, so that it is possible to commonize software which controls these apparatuses to be monitored.

iv. A difference in set-up situation of a plurality of apparatuses to be monitored can be identified easily.

Although "parameter value signification" and 'parameter acquisition range', which indicate the same set-up item, are the same, if a "parameter identifier ID" is defined uniquely for each type when changing the same set-up items, it is necessary to specify the corresponding parameter identifier for each type and execute a change instruction. Table 1 lists set-up items, parameter identifier IDs for types A and B, and "parameter value signification/parameter acquisition range", showing an example of contents of a high-order information conversion table.

TABLE 1

| Set-up item | Value signification/ acquisition range | Definition of parameter identifier (ID) | |
|---|---|---|---|
| | | In the case of type A | In the case of type B |
| PRE-ROLL TIME | 0 . . . 30 | 100000 | 300001 |
| CHARACTER H-POSITION | 0 . . . 127 | 150002 | 300002 |
| CHARACTER V-POSITION | 0 . . . 127 | 150003 | 300003 |

If apparatuses to be monitored are of such different types as the above, to provide the same parameter set-up for types A and B, different commands are desirable to be executed respectively for the types.

The command for type A is:

100000=5, 150002=1, 150003=0

The command for type B is:

300001=5, 300002=1, 300003=0

On the other hand, if definition is the same for "parameter identifier (ID)" but "parameter value signification" is different, for example, in order to provide the same parameter set-up for types C and D, different commands are desirable to be executed respectively for the types. Table 2 lists set-up items, parameter identifier IDs, and "parameter value signification" for types C and D, showing an example of contents of a low-order hierarchy information conversion table.

TABLE 2

| Set-up item | Parameter identifier (ID) | Parameter value signification | |
|---|---|---|---|
| | | In the case of type c | In the case of type D |
| PRE-ROLL TIME | 100000 | 0:0 s<br>1:1 s<br>2:2 s<br>.<br>.<br>. | 0:0 s<br>1:5 s<br>2:10 s<br>.<br>.<br>. |
| CHARACTER H-POSITION | 150002 | 0:0<br>1:1<br>2:2<br>.<br>.<br>. | 0:0<br>1:10<br>2:20<br>.<br>.<br>. |

TABLE 2-continued

| | | Parameter value signification | |
|---|---|---|---|
| Set-up item | Parameter identifier (ID) | In the case of type c | In the case of type D |
| CHARACTER V-POSITION | 150003 | 0:0<br>1:1<br>2:2<br>.<br>.<br>. | 0:0<br>1:10<br>2:20<br>.<br>.<br>. |

If such types C and D as listed in Table 2 are of apparatuses to be monitored having different pieces of "parameter value signification", to provide the same parameter set-up for types C and D, different commands are desirable to be executed respectively for the types.

The command for type C is:
100000=5, 150002=10, 150003=20
The command for type D is:
100000=1, 150002=1, 150003=2

It is to be noted that even if apparatuses to be monitored are of different types when they are of the same "parameter identifier (ID)" and "parameter value signification", which represent the same set-up item, the following only one command to be executed to provide the same parameter set-up for all the types of these apparatuses to be monitored are desirable to be prepared:

Common command; 100000=5, 150002=1, 150003=2

Further, although such a case may be thought that "acquisition range" is small or wide even when the same set-up parameter is set to types, if a parameter value outside the acquisition range is specified, apparatus #1 to be monitored etc. can send NACK (negative acknowledgement) etc. to the personal computer 103 to notify the control system of a failure, to realize set-up by use of the common command over the different types of devices. A communication format is applicable similarly regardless of a difference in protocol format (SNMP, HTTP, unique protocol, etc.) as far as it is commonized for all the types thereof to be subjected.

For example, in the case of a protocol compliant with SNMP as an example other than a VTR by means of ISR compliant with SMDP, the corresponding parameter is identified global-uniquely by specifying an object ID. Since a possible acquisition range of parameters and parameter value signification (adjustment contents) are also defined in accordance with SMI, its parameter setting can be changed according to the same procedure irrespective of manufacturers and types of apparatuses as far as the apparatuses support that object.

For example, a variable of system group SNMP MIB-2 is indicated by:
Object ID: 1. 3. 6. 1. 2. 1. 1. 6
Object name: .iso. org. dod. internet. mgmt. mib-2. system. sysLocation
Object model: Display String (SIZE (0.255)).

In this embodiment, if the following conditions are satisfied, all parameter settings can be changed at a time on a plurality of apparatuses #1 to #N to be monitored.

i. As shown in FIG. 1, the apparatuses to be monitored such as VTRs 204 to 206 can be communicated with each other in accordance with the control software 301.

ii. Set-up parameter definition given by the same parameter identifier ID is unified for all the relevant apparatuses.

iii. A communication protocol (SNMP, HTTP, FTP, etc.) for changing the set-up parameters is unified for all the apparatuses.

FIG. 2 is a block diagram of a communication-processing example (No. 1) at the time of parameter-setting change in the remote maintenance system 1.

According to the communication-processing example shown in FIG. 2, the personal computer 103 having the above-described control software 301 performs communication processing with apparatus #1 to be monitored such as the VTR 204 independently for each thread. For example, the control software 301 is provided with common commands 100000=5, 150002=1, 150003=2, ..., as a parameter identifier ID.

Furthermore, as a counter for setting parameters of the personal computer 103, communication threads #S, #S2, ..., are prepared for each of the apparatuses to be monitored. For example, to change parameter settings, the communication thread #S1 is connected to the apparatus #1 to be monitored, to issue a common command such as a parameter identifier ID. The apparatus #1 to be monitored receives the parameter identifier ID from the personal computer 103, analyzes this received parameter identifier ID, converts this analyzed parameter identifier ID into a parameter identifier ID of the apparatus #1 to be monitored, and changes a parameter setting of the apparatus #1 to be monitored according to adjustment contents of the set-up item correlated with the post-conversion parameter identifier ID. When the parameter setting is changed at the apparatuses #1 to be monitored, the apparatus #1 to be monitored sends back a response (response notification) to the communication thread #S1.

For a group in which many apparatuses to be monitored of different types are mixed, communication threads #S2, ... are prepared besides thread #S1. For example, to change a parameter setting, the communication thread #S1 is connected to the apparatus #1 to be monitored and the communication thread #S2 is connected to the apparatus #2 to be monitored, and a common command such as a parameter identifier ID is issued to each of the apparatuses #1, #2, etc. to be monitored. The apparatuses #1, #2, etc. to be monitored each receive the parameter identifier ID from the personal computer 103, analyze this received parameter identifier ID, convert this analyzed parameter identifier ID into a parameter identifier ID of each of the apparatuses #1 and #2, etc. to be monitored and change a parameter setting in the apparatuses #1, #2, etc. to be monitored according to adjustment contents of the set-up items correlated with each of the post-conversion parameter identifiers ID.

If parameter settings can be processed concurrently in such a manner, one common command provided to the control software 301 is issued to N number of the apparatuses #1, #2, ..., to be monitored so that all the parameter settings can be changed at a time. When the parameter settings are changed on apparatus #i etc. to be monitored, the response (response notification) is sent back from each of the apparatuses, #1, #2, etc. to be monitored to the communication threads #S1, #S2, etc. The communication-processing example shown in FIG. 2 is applicable regardless of the communication protocol (SNMP, HTTP, FTP, etc.).

FIG. 3 is a block diagram of the communication-processing example (No. 2) at the time of parameter-setting change in the remote maintenance system 1.

According to the communication-processing example shown in FIG. 3, the personal computer 103 having the above-described control software 301 performs sequential processing of a common command on N number of apparatuses #i (i=1 to N) to be monitored. The control software 301 is provided with common commands 100000=5, 150002=1, 150003=2, ..., as a parameter identifier ID. As a parameter setting counter for the personal computer 103, one communication thread 302 is prepared.

In this embodiment, first communication processing is performed with the first apparatus #1 to be monitored such as VTR 204. For example, to change a parameter setting, the communication thread 302 is connected to the apparatus #1 to be monitored, to issue a common command such as a parameter identifier ID. The apparatus #1 to be monitored receives the parameter identifier ID from the personal computer 103, analyzes this received parameter identifier ID, converts this analyzed parameter identifier ID into a parameter identifier ID of the apparatus #1 to be monitored, and changes a parameter setting of the apparatus #1 to be monitored according to adjustment contents of the set-up item correlated with the post-conversion parameter identifier ID. When the parameter setting is changed at the apparatus #1 to be monitored, the apparatus #1 to be monitored sends back a response (response notification) to the communication thread 302.

Then, second, communication processing is performed with the apparatus #2 to be monitored such as VTR 205. For example, to change a parameter setting, the communication thread 302 is connected to the apparatus #1 to be monitored, to issue a common command such as a parameter identifier ID. The apparatus #2 to be monitored receives the parameter identifier ID from the personal computer 103, analyzes this received parameter identifier ID, converts this analyzed parameter identifier ID into a parameter identifier ID of the apparatus #2 to be monitored, and changes a parameter setting of the apparatus #2 to be monitored according to adjustment contents of the set-up item correlated with the post-conversion parameter identifier ID. When the parameter setting is changed at the apparatus #2 to be monitored, the apparatus #2 to be monitored sends back a response (response notification) to communication thread 302.

In such a manner, according to the remote maintenance system according to each embodiment of the present invention, to process a parameter identifier ID that specifies a set-up item of an apparatus to be monitored connectable to a network, the personal computer 103 that sets a parameter or parameters and, for example three VTRs 204 to 206 that correspond to the apparatus #1 to #3 to be monitored are connected to each other via the network 101, the access points 104 and 201, and the network 201. Then, the VTRs 204 to 206 receive the parameter identifier ID from the personal computer 103. The VTR 204 etc. analyzes the received ID parameter identifier ID and converts this analyzed parameter identifier ID into a parameter identifier ID of each of the VTRs 204 etc. The VTR 204, for example, changes a parameter setting of this VTR 204 according to adjustment contents of the set-up item correlated with the post-conversion parameter identifier ID.

It is thus possible to change, at a time, all of the parameter settings of the three VTR 204 to 206 connected to the network 101, the access points 104 and 201, and the network 201 to a common parameter setting. Moreover, even if a type of, for example, the VTR 204 and that of the VTR 205, which are placed under the remote management of the personal computer 103 that sets the parameter(s) are different from each other, it is possible to change all the parameters at a time, thereby easily setting the same set-up item of each of the types of apparatuses to the same value.

It is thus possible for a person in charge of services or management to mitigate a job of going to a job site and managing and inspecting electronic apparatuses such as VTRs one by one and easily perform consolidated management and operation, thereby suppressing support costs on the job site.

For example, at a broadcast station, there is a case where parameters of the VTRs 204 etc. are changed unavoidably when a VTR or an editing facility is replaced with an alternate one owing to a periodic inspection or occurrence of a trouble. In such a case, it is possible to operate a variety of VTRs, editing facilities, etc. in accordance with predetermined settings by periodically uploading (gathering) parameters beforehand to video equipment units placed under the remote management of the personal computer 103 that sets the parameter or parameters so that as necessary a parameter identifier ID can be downloaded at a time to all of the plurality of video equipment units under the remote management of this personal computer 103.

According to embodiments of the present invention, batch processing of set-up parameters to a large number of apparatus #1 to #N to be monitored that correspond to the consolidated remote management apparatus can be realized by the control software 301, so that it is possible to reduce man-hour requirements on maintenance of the information management system 100, the video-editing system 200, and a group of management apparatuses and also avoid an error in setting and operation owing to a man-caused mistake of a person in charge of management that is liable to occur when individually setting the plurality of VTRs and video editors.

Further, the remote maintenance system 1 related to the embodiment of the present invention can be applied to the case of providing the same setting for all of a large number of electronic apparatuses at a time regardless of being a broadcast device. Thus, it can be utilized to change the settings by using an infra-red type remote controller attached to a consumer device, perform self-diagnosis on a network printer arranged in an office and change its settings and modes all at night, and manage and operate venders (automatic vending machines) arranged in various areas.

It is to be noted that a scheme according to the embodiment of the present invention can have excellent effects at a period of transition until unified standards of parameter-setting processing are established and greatly contributes to unification of the parameter-setting processing. When the unified parameter standards are realized among enterprises, manufacturers can easily perform management and operation of equipment and materials including those of any other companies and provide wider support services, thereby enriching contents of support contracts with customers more than before.

Figure 4:
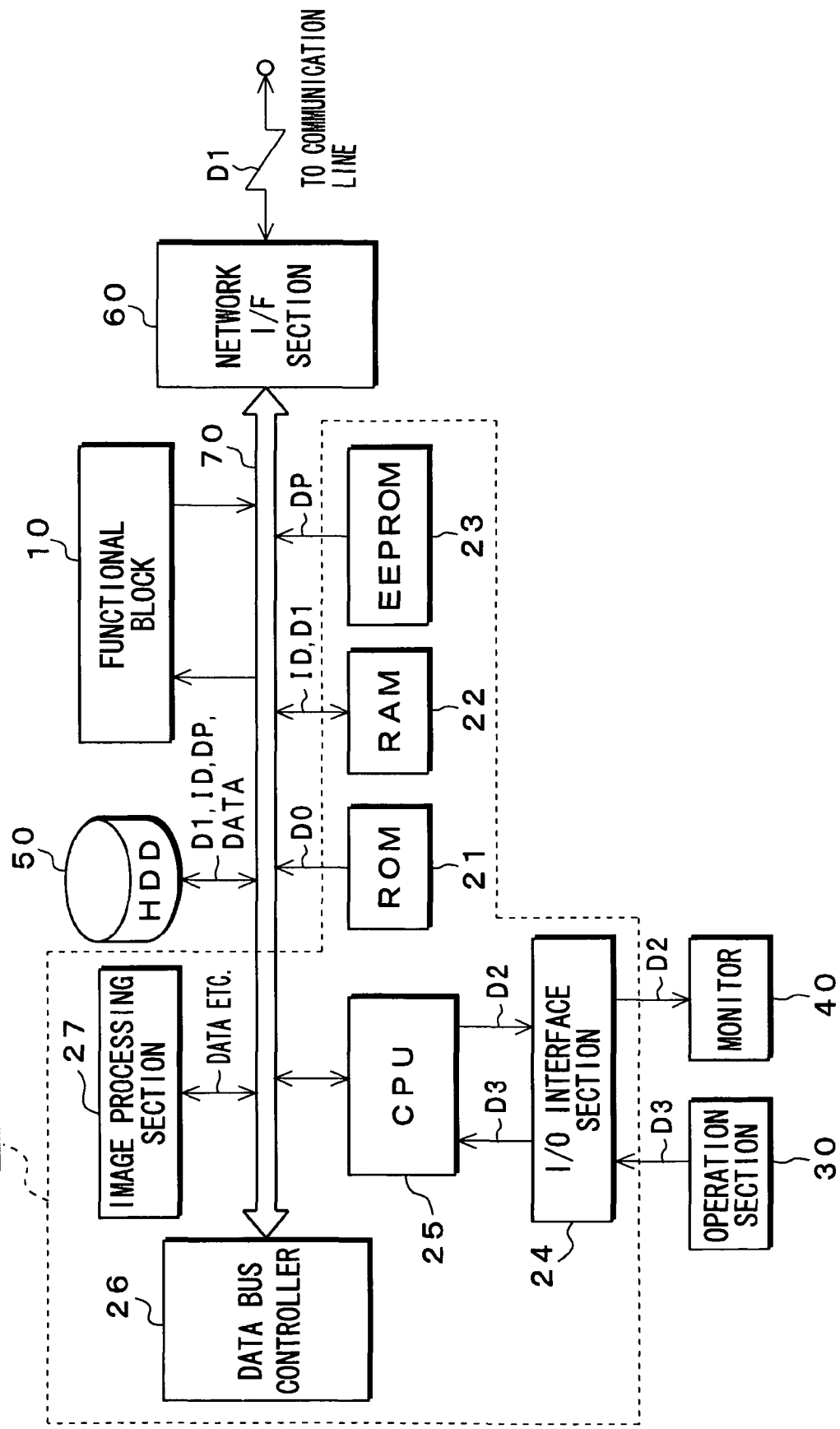
FIG. 4 is a block diagram of a configuration of a monitoring-subject device #i according to an embodiment of the present invention.

FIG. 4 is a block diagram of a configuration of apparatus #i to be monitored according to each embodiment of the present invention.

The apparatus #i to be monitored shown in FIG. 4 is an electronic apparatus that can be connected via a network to the personal computer 103 that sets the parameter(s). The apparatus #i is subject to parameter setting when a parameter identifier ID that specifies a set-up item, which is a set-up attribute of a predetermined function, is processed. The apparatus #i to be monitored may come in a VTR, a video editor, and a printer as well as any electronic apparatus to which a parameter identifier ID can be downloaded.

The apparatus #i to be monitored has a function block 10, a control apparatus 20, an operation section 30, a monitor 40, a hard disk (hereinafter abbreviated as "HDD 50"), a network interface (I/F) section 60, and a data bus 70. In a case where this apparatus #i to be monitored is a VTR, the functional block 10 is comprised of a videotape loading mechanism and a magnetic recording/reproducing apparatus. In a case where this apparatus is a video editor, the block is comprised of two suites of videotape loading mechanisms for editing and a magnetic recording/reproducing apparatus. In a case where this apparatus is a printer, the block is comprised of a paper feed mechanism, an image formation apparatus, etc.

The control apparatus 20 has a read only memory (ROM) 21, a random access memory (RAM) 22, an EEPROM 23, an I/O interface section 24, a central processing unit (CPU) 25, a data bus controller 26, and an image-processing section 27.

The ROM 21 stores system program data D0 for controlling this apparatus as a whole. The RAM 22 is used ad a work memory, to temporarily store a common command (SNMP command) etc., which are employed in the embodiments of the present invention. The CPU 25, when its power is turned ON, reads the system program data D0 from the ROM 21 to activate the system, thereby controlling this apparatus as a whole based on operation data D3 from the operation section 30.

The EEPROM 23 is one example of storage device and stores a computer-readable program DP related to the embodiments of the present invention. The program DP is program data that processes a parameter identifier ID that specifies a set-up item, which is an adjustment attribute of a predetermined function of this apparatus #i to be monitored. The program DP has a step of receiving a parameter identifier ID from the personal computer 103 that sets the parameter(s), a step of analyzing the received parameter identifier ID, a step of converting the analyzed parameter identifier ID into a parameter identifier ID of the apparatus #i to be monitored, and a step of changing a parameter setting of the apparatus #i to be monitored according to adjustment contents of the set-up item correlated with the post-conversion parameter identifier ID.

According to this program DP, when this apparatus #i to be monitored is connected to the network, the CPU25 performs reception processing regularly or irregularly so that parameter settings can be changed all into a common parameter setting at a time. Moreover, even if a type of the apparatus #i to be monitored under the remote management of the parameter setting personal computer 103 is different from that of this apparatus #i to be monitored, parameters can be changed all at a time, thereby easily setting same set-up item of all the types of apparatuses to the same value.

In the present embodiment, the EEPROM 23 is provided with a command (information) conversion table besides the above-described program DP. The command conversion table is used to convert a parameter identifier ID of an apparatus of any other company (company B) placed under the remote management of the personal computer 103 that sets the parameter(s) into a parameter identifier ID of its own company (company A). The command conversion table used to convert the ID of company B to that of company A is provided beforehand, for example, in electronic data from any other company to its own company and read into the EEPROM 23 etc. on the side of the apparatus #i to be monitored, so that the CPU 25 can handle it. The command conversion table has such contents as shown in Tables 1 and 2, for example. In this conversion processing, a parameter identifier ID of any other company's apparatus placed under the remote management of the personal computer 103 is used as an address to read a parameter identifier ID of this device of its own company.

To the CPU 25, the I/O interface section 24 is connected to control input/output of the operation data D3 and display data D2. To the I/O interface section 24, the operation section 30 and the monitor 40 are connected. The operation section 30 has an input tool such as a keyboard and a mouse, etc., a touch panel, a jog dial, etc. and, if the apparatus is an VTR, it is equipped with button switches for recording, reproducing, fast feeding, fast rewinding, stopping, etc. Those operation tools are operated by an operator. The operation data D3 obtained through an operation instruction is output to the CPU 25 via the I/O interface section 24.

In a case where this apparatus is a VTR, the monitor 40 displays a recorded video or a reproduced video in accordance with the display data D2. In a case where it is a video editor, an edited video is displayed. In a case where it is a printer, an operation selection screen etc. is displayed for selecting printer conditions. As the monitor 40, a liquid crystal display, a flat display apparatus such as a PDP, or a cathode ray tube display is used.

To the CPU25, the data bus 70 is connected. To the data bus 70, the network I/F section 60, which provides one example of the reception 1D means, is connected. The data bus 70 is connected to the network 202, etc. shown in FIG. 1, to receive a parameter identifier ID from the personal computer 103 that sets the parameter(s). The parameter identifier ID is transferred from the network I/F section 60 to the HDD 50 or the CPU 25.

To the data bus 70, the data bus controller 26 and the HDD 50 are connected, to provide such control that data processed by the functional block 10 and the control apparatus 20 and command data D1 taken into from an outside may be stored in the HDD 50. The hard disk (HDD 50) is adapted to store the data processed by the functional block 10 and the control apparatus 20 as well as a parameter identifier ID downloaded from the personal computer 103. The image-processing section 27 performs image processing such as compression and encoding of data to be stored in the HDD 50 and decoding and decompression of data read from the HDD 50.

Figure 5:
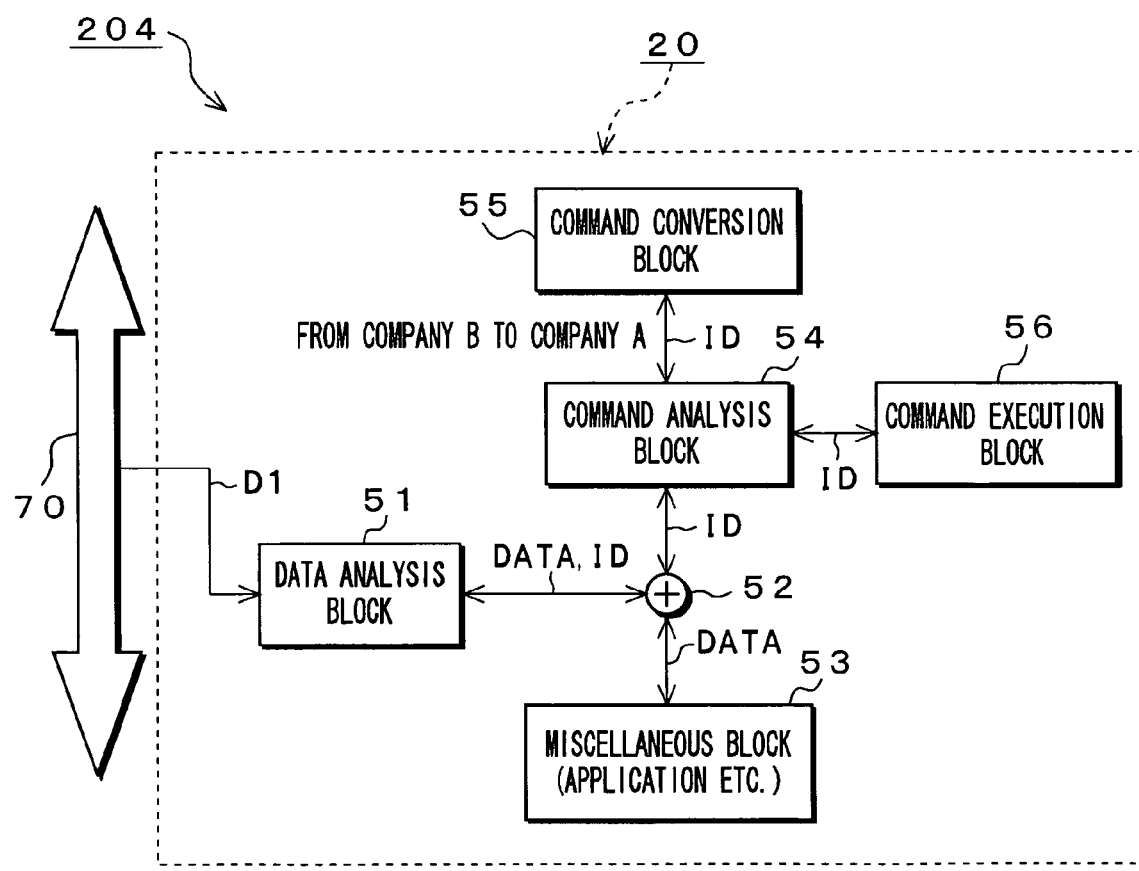
FIG. 5 is a diagram for showing a configuration (at the time of reception) of a control block constituted in a control apparatus 20 on a side of the monitoring-subject device #i shown in FIG. 4.

FIG. 5 shows a configuration (at the time of reception) of a control block constituted in the control apparatus 20 on the side of the apparatus #i to be monitored that is shown in FIG. 4 related to an embodiment of this invention. FIG. 5 also shows that a flow of command data D1 supplied from the control software 301 is taken into the CPU 25 after the command data D1 has been received via the network I/F section 60.

In the present embodiment, the CPU25 has a command conversion block 55 for enabling the parameter setting to be written therein at a time. An ordinary command format is made up of a parameter identifier (ID) that specifies a set value and the set value (VALUE). To perform the command conversion, such the command conversion block 55 can be provided as to have a mechanism that absorbs a difference between the two.

In the present embodiment, the command data D1 input from the outside such as a network is transferred to the CPU25 via the data bus 70. In the control apparatus 20 shown in FIG. 5, around the CPU25 shown in FIG. 4 as a center, there are constituted a data analysis block 51, a data separation/synthesis section 52, a miscellaneous block 53, a command analysis block 54, the command conversion block 55, and a command execution block 56.

The data analysis block 51 makes up part of analysis means, to receive command data D1 via the network I/F section 60 and analyze contents of the data. The command data D1 is made up of, for example, a header portion, a parameter identifier ID, data (DATA) such as an application, and a tailer portion. The data analysis block 51 analyzes the command data D1, to extract (detect) the parameter identifier ID and the data.

To the data analysis block 51, the data separation/synthesis section 52 is connected, so that a header portion and a tailer portion are separated from the command data D1 after data analysis processing, to divide the data into, for example, a parameter identifier ID and data such as an application. In other words, the data separation/synthesis section 52 converts the command data D1 into such a condition where it has a data portion only.

To the data separation/synthesis section 52, the miscellaneous block 53 and the command analysis block 54 are connected. The miscellaneous block 53 performs data processing for an application etc. separated from the command data D1. For example, a device etc. in which a web server is installed may be supplied with the command data D1 of an HTTP protocol, for example, in which case the command data D1 is handed over to a web server process and processed.

The command analysis block 54 receives a parameter identifier ID after data analysis processing and performs command analysis processing. In the command analysis processing, it is decided whether relevant command data D1 is of its own company (company A) or of any other company (company B). According to whether the parameter identifier ID matches its own (company's command, this command analysis block 54 decides whether the command is of any other company. If the command is of any other company (company B) other than its own company, the command is passed through the command conversion block 55 so that it can be handled as its own company's command. If the command is of its own company, the command conversion block 55 is bypassed.

To the command analysis block 54, the command conversion block 55 is connected; in this condition, if a command is of any company other than its own company, a parameter identifier ID after being analyzed by the command analysis block 54 is converted into a parameter identifier ID of a relevant device.

In this parameter conversion, the CPU 25 references the command conversion table stored in the EEPROM 23. In conversion processing of this step, the command conversion table for company-B-to-company-A conversion is provided beforehand from the other company in electronic data and written into the EEPROM 23 etc. on the side of the apparatus #i to be monitored so that the CPU 25 can handle it. For example, the command conversion block 55 reads out a parameter identifier ID of the relevant device of company A by using as an address a parameter identifier ID of an apparatus to be monitored of the other company placed under remote management of the personal computer 103. At this time, a fact that "company-B-to-company-A" conversion has been performed on the present command is stored in the RAM 22 etc.

To the command analysis block 54, besides the command conversion block 55, the command execution block 56 is connected. The command conversion block 55 transfers a post-conversion command of its own company (company A) to the command execution block 56. This transfer is performed to execute its own company's (company A) command. The command execution block 56 of its own company changes a parameter setting of the relevant apparatus according to adjustment contents of a set-up item correlated with the post-conversion parameter identifier ID.

In the present embodiment, as a lower-order hierarchy of the above processing, the command analysis block 54 analyzes a command of the parameter identifier ID and then analyzes the adjustment contents of the set-up item, while the command conversion block 55 converts the analyzed adjustment contents of the set-up item into adjustment contents of the relevant apparatus. The command execution block 56 changes a parameter setting of the relevant apparatus according to the post-conversion adjustment contents (see Table 2).

Figure 6:
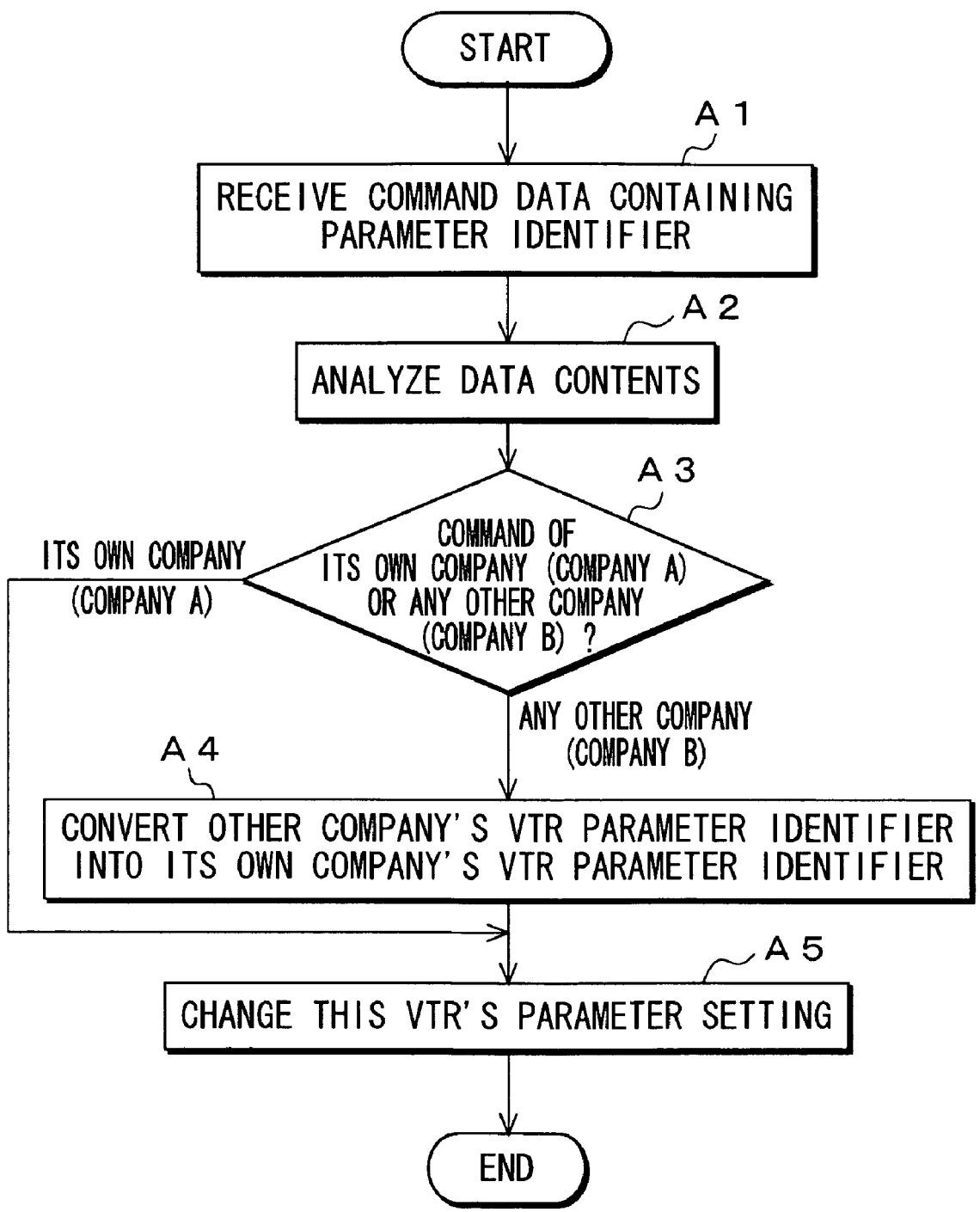
FIG. 6 is a flowchart of a parameter-setting example according to an embodiment.

The following will describe an embodiment of an information-processing method related to the present invention. FIG. 6 is a flowchart of a parameter-setting example according to the embodiment.

In the present embodiment, in the remote maintenance system 1 shown in FIG. 1, such a case is assumed that a parameter identifier ID may be processed which specifies a set-up item of the apparatus #i to be monitored that is connected to a network. The personal computer 103 that sets a parameter and the apparatus #i to be monitored are connected to each other through communication means. In the present embodiment, the apparatus #i to be monitored is assumed to be the VTR 204.

The information management system 100 and the video-editing system 200 shown in FIG. 1 can of course communicate with the access points 104 and 201 and, moreover, such communication means as these networks 101, 102, and 202 is communication enabled by the control software 301 when the parameter setting is changed.

Under these conditions for the parameter-setting processing, at step A1 of the flowchart shown in FIG. 6, the VTR 204 receives command data D1 containing a parameter identifier ID of its own or any other company from the personal computer 103 that sets the parameter(s). In this step, the network I/F section 60 receives and takes in the command data D1 from the network 202 and transfers it to the CPU25 via the data bus 70.

Next, at step A2, the data analysis block 51 receives the command data D1 via the network I/F section 60 and performs analysis processing on data contents. In this case, the data analysis block 51 analyzes the command data D1 comprised of a header portion, a parameter identifier ID, data such as an application, and a tailer portion, to extract (detect) the parameter identifier ID and the data. The data separation/synthesis section 52 removes the header portion and the tailer portion from the command data D1 after the data analysis processing, and divide it into the parameter identifier ID and the data such as an application.

The miscellaneous block 53 performs data processing on an application etc. separated from the command data D1. For example, the VTR 204 etc. in which a Web server is installed may be supplied with the command data D1 of an HTTP protocol etc. The command data D1 is handed over to a server process and processed.

At the next step A3, the command analysis block 54 receives the parameter identifier ID after data analysis processing and performs command analysis processing thereon. In the command analysis processing, it is decided whether this command data D1 is of its own company (company A) or of any other company (company B). For example, according to whether the parameter identifier ID matches its own company's command, this command analysis block 54 decides whether the command is of any other company.

If the command is of any other company (company B) other than its own company, the process goes to step A4 where the command conversion block 55 converts the parameter identifier ID of the any other company's VTR analyzed by the command analysis block 54 into a parameter identifier ID of the relevant VTR 204. At this time of parameter conversion, the CPU 25 references the command conversion table stored in the EEPROM 23. In conversion processing of this step, the parameter identifier ID of the relevant VTR 204 of company A is read out by using as an address the parameter identifier ID of the VTR of the other company placed under remote management of the personal computer 103. In this step, a fact that "company-B-to-company-A" conversion has been performed on the present command is stored in the RAM 22 etc.

By thus passing it through the command conversion block 55, it can be handled as its own company's command.

Then, at step A5, the command execution block 56 of its own company is supplied with the post-conversion command of its own company (company A) from the command conversion block 55. The command execution block 56 changes a parameter setting of the relevant VTR 204 according to adjustment contents of a set-up item correlated with the post-conversion parameter identifier ID of its own company.

If the command is decided at step A3 to be of its own company, the command conversion block 55 is bypassed, so that the process goes to step A5. At step A5, the command execution block 56 is supplied with the command of its own company (company A) from the command analysis block 54. The command execution block 56 of its own company changes a parameter setting of the relevant VTR 204 according to adjustment contents of a set-up item correlated with the parameter identifier ID of its own company.

As described above, according to the VTR and the information processing method of these embodiment of the present invention, to process a parameter identifier ID that specifies a set-up item, the command conversion block 55 of the VTR 204 converts any other company's parameter identifier ID analyzed by the command analysis block 54 into a parameter identifier ID of this VTR 204 of its own company. The command execution block 56 changes a parameter setting of this VTR204 according to adjustment contents of a set-up item correlated with the post-conversion parameter identifier ID of its own company.

Therefore, even if a type of a VTR of any other company placed under the remote management of the personal computer 103 that sets the parameter(s) is different from that of the VTR 204 of its own company, it is possible to easily change a set-up parameter, thereby setting the same set-up items of all the types of apparatuses to the same value. It is thus possible for a person in charge of services or management to mitigate a job of going to a job site and managing and inspecting the VTRs 204 etc. to be monitored one by one. Further, it is possible for the remote maintenance system 1 to easily and efficiently change a large number of apparatuses to be monitored that are similar but different from each other into a desired environment or setting.

Figure 7:
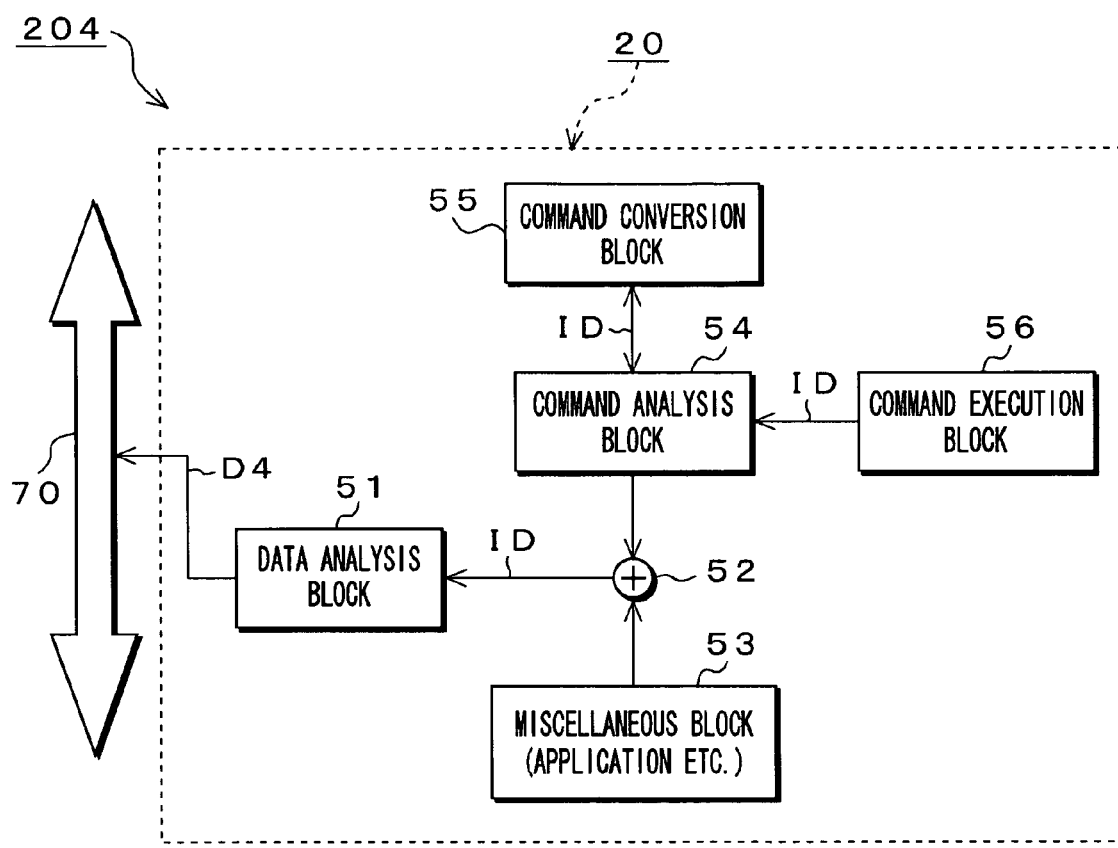
FIG. 7 is a diagram for showing a configuration (at the time of response) of the control block constituted in another embodiment of the control apparatus 20 according to the invention.

FIG. 7 shows a configuration (at the time of response) of a control block constituted in another embodiment of control apparatus 20 according to the invention.

A command execution block 56 shown in FIG. 7 executes a command and then outputs, to a command analysis block 54, response data of its own company (company A), which is a result of command execution by its own company (company A). The command analysis block 54 references an RAM22, to decide whether "company-B-to-company-A" conversion such as described in the above embodiment has been performed on the present command. If such is the case, it outputs its own company's response data to the command conversion block 55.

The command conversion block 55 converts the its own company's response data into response data of the other company (company B). The post-conversion response data of the other company is transferred to a command analysis block 54. The command analysis block 54 correlates the other company's response data with the other company's parameter identifier ID. It is to be noted that to send back its own company's response data to a personal computer 103 for handling its own company's parameter identifier ID, "company-B-to-company-A" conversion at the command conversion block 55 is bypassed.

The other company's response data correlated with the other company's parameter identifier ID is output to a data separation/synthesis section 52, which in turn synthesizes, as necessary, the other company's response data with result data etc. of an application processed by a miscellaneous block 53. The post-synthesis data is output to a data analysis block 51.

The data analysis block 51 adds a header portion or a tailer portion to the post-synthesis data and reorganizes it into a data structure that can be transmitted to an outside such as a network. The reorganized data provides command response data D4. The data analysis block 51 transmits the other company's command response data D4 reorganized into a predetermined data structure, from a CPU25 to a data bus 70. A network I/F section 60 transmits to the outside the other company's command B response data D4 sent through the data bus 70. If command response is unnecessary, the above-described processing is omitted.

Figure 8:
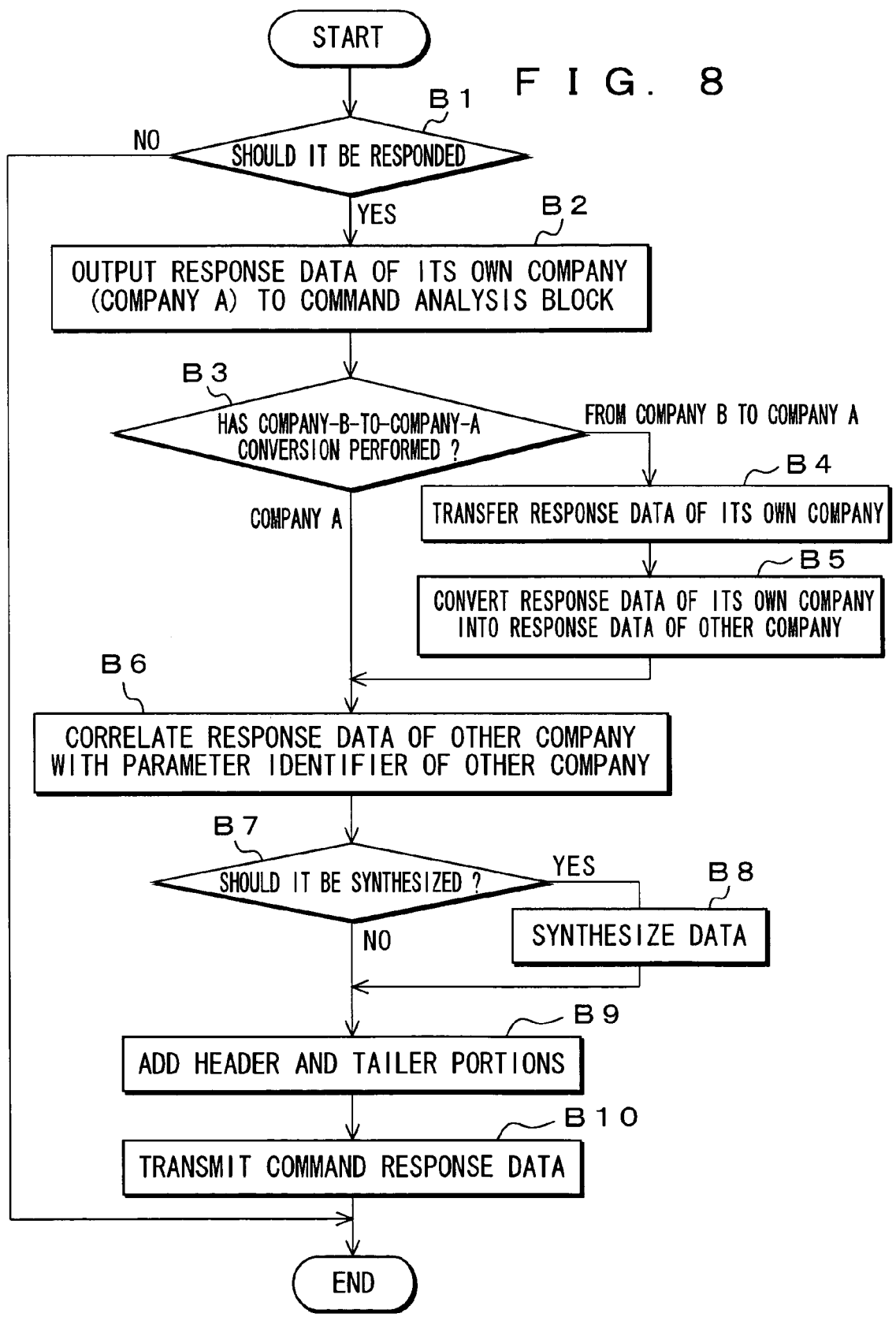
FIG. 8 is a flowchart of an example of response after a command related to a VTR setting parameter is executed.

FIG. 8 is a flowchart of an example of response after a command related to a VTR set-up parameter is executed.

In the present embodiment, such an example is described that in a remote maintenance system 1 shown in FIG. 1, a VTR 204 etc. connected to a network executes a command related to a VTR set-up parameter and sends, in response, a result of this command execution to the personal computer 103 that sets the parameter(s). An information management system 100 and a video-editing system 200 shown in FIG. 1 can of course communicate with access points 104 and 201 and, moreover, such communication means as networks 101, 102, and 202 are communication-enabled by control software 301 when a command execution result is given in response.

Under these conditions for response processing of the command execution result, at step B1 of the flowchart shown in FIG. 8, it is decided whether a command execution result should be responded. A criterion in this step is whether the personal computer 103 that sets the parameter(s) requests to do so. If the request is not given, no response is sent. A request from the personal computer 103 is either written in command data at the time of parameter setting or transferred after command execution.

If response request of such the command execution result is given, the process goes to step B2 where the command execution block 56 shown in FIG. 7 executes a command and outputs response data of its own company m (company A), which is a result of executing the command of its own company (company A), to the command analysis block 54. Then, the command analysis block 54 references the RAM22 at step B3, to decide whether "company-B-to-company-A" conversion as described in the above embodiment has been performed on the present command. If it is decided by referring the RAM 22 that the command is "company-B-to-company-A" converted at the time of parameter setting, the process goes to step B4. At step B4, the command analysis block 54 transfers its own company's response data to the command conversion block 55.

Next, at step B5, the command conversion block 55 converts the response data of its own company into response data of the other company (company B). The post-conversion response data of the other company is transferred to a command analysis block 54. Then, at step B6, the command analysis block 54 correlates the response data of other company with the parameter identifier ID of other company. It is to be noted that to send, at step B3, its own company's response data to the personal computer 103 for handling its own company's parameter identifier ID, "company-B-to-company-A" conversion at the command conversion block 55 is bypassed.

The other company's response data correlated with the other company's parameter identifier ID is output to a data separation/synthesis section 52. At step B7, the data separation/synthesis section 52 decides whether it should synthesize the other company's response data with result data etc. of an application processed by the miscellaneous block 53. If both items of data are synthesized, it outputs command response data D4 obtained as a result of synthesis of both items of data at step B8, to the data analysis block 51. Otherwise, the process bypasses step B8 and goes to step B9. The command response data D4 output from the data separation/synthesis section 52 is output to the data analysis block 51.

At step B9, the data analysis block 51 adds a header portion and a tailer portion to the command response data either synthesized or not and reorganizes it into a data structure that can be transmitted to an outside such as a network. Then, at step B10, the data analysis block 51 transmits the other company's or its own company's command response data D4 reorganized into a predetermined data structure, from the CPU 25 to the data bus 70. The network I/F section 60 transmits the other company's or its own company's command response data D4 transmitted through the data bus 70, to the personal computer 103 that sets the parameter(s). It is to be noted that if it is decided at step B1 that a command execution result is not to be sent in response, the above-described processing is omitted.

As described above, according to the above embodiments of the VTR and the information-processing method of the present invention, to send, in response, a command execution result to the personal computer 103 that sets the parameter(s), the command conversion block 55 converts its own company's response data into response data of any other company (company B). The post-conversion command response data D4 of the other company is transmitted to the personal computer 103 through the command analysis block 54, the data separation/synthesis section 52, the data analysis block 51, and the network I/F section 60.

Therefore, even if a type of a VTR of any other company placed under the remote management of the personal computer 103 that sets the parameter(s) is different from that of the VTR 204 of its own company, it is possible to easily respond, in response, a parameter setting result to the personal computer 103. It is thus possible for a person in charge of services or management to mitigate a job of going to a job site and managing and inspecting the VTRs 204 etc. to be monitored one by one.

THIRD EMBODIMENT

FIG. 9 shows a configuration (at the time of reception of OID) of a control block constituted in further embodiment of a control apparatus 20 according to the invention.

In the present embodiment, is described an example where a command for turning ON/OFF power of certain apparatus #i to be monitored relative to its own company (company A) and any other company (company B) is defined on a management information base (MIB) and its parameter identifier (ID) is to be converted. The NIB is network managing software that is built into a field-specific tree structure in order to put the apparatus #i to be monitored into a database so that parameters etc. may be retrieved and set efficiently.

According to the simple network management protocol (SNMP) enumerated as a monitoring protocol compliant with the network industry standards, an object (set value) is defined on an MIB, to identify which object, an object ID (OID) is used. An existing OID example is ".1.3.6.1.4.1.122.8501.2.2.4.1.3.iso(1) .org(3) .dod(6) .internet(1) .priv ate(4) .enterprises(1) .xxxx(122) .professionalV1 (8501) .proV1Common(2) .pr oV1Agent-Info(2) .proV1TrapDestTable(4) .proV1TrapDestEntry(1) .proV1TrapD estEntryStatus(3)".

In the present embodiment, companies A and B each define set-up items of certain apparatus #i to be monitored by using an OID shown in Table 3. In the present embodiment, parameter-setting processing is performed on the basis of an OID (parameter identifier ID+set-up item). The set-up item (which means an object) is power ON/OFF, a power OFF timer, a channel switching or the like.

TABLE 3

| Meaning of object | OID of company A | OID of company B |
|---|---|---|
| Power ON/OFF | .1.3.6.1.4.1.50000.1.4.2 | .1.3.6.1.4.1.70000.3.8.1.1 |
| Power OFF timer | .1.3.6.1.4.1.50000.1.4.3 | .1.3.6.1.4.1.70000.3.8.1.5 |
| Channel switching | .1.3.6.1.4.1.50000.1.4.4 | .1.3.6.1.4.1.70000.3.8.1.2 |

In the present embodiment, the apparatus #i to be monitored of company B can execute a company B-defined command as it is, whereas the apparatus #i to be monitored of company A is difficult to understand the company B-defined command as it is. Therefore, by referencing an OID conversion table at a command conversion block 55 shown in FIG. 9, a company B-defined command can be converted into a command that is interpreted by a command execution block 56 of company A so that parameter setting changing processing etc. can be performed.

In the present embodiment also, command data D1 input from an outside such as a network is transferred via a data bus 70 to a CFU 25. As described in the embodiment shown in FIG. 5, a data analysis block 51 shown in FIG. 9 receives the command data D1 from the network I/F section 60 shown in FIG. 4, to analyze contents of the data. In the present embodiment, the data analysis block 51 analyzes command data D1 of an OID defined on an NIB in an SNMP format, to extract (detect), for example, a company B's OID=".1.3.6.1.4.70000.3.8.1.1" that indicates a set-up item=power ON/OFF.

A data separation/synthesis section 52 removes a header portion and a tailer portion from the command data D1 after data analysis processing, to output a company B's OID=".1.3.6.1.4.1.70000.3.8.1.1" to a command analysis block 54. The command analysis block 54 receives the company B's OID=".1.3.6.1.4.1.70000.3.8.1.1" after data analysis processing, to perform command analysis processing thereon. In the command analysis processing, it is decided whether the data-analyzed command data D1 is of its own company (company A) or any other company (company B).

According to whether the OID matches a command of its own company, this command analysis block 54 decides whether it is a command of any other company, etc. If the command is of any company (company B) other than its own company, the command conversion block 55 is passed through so that the command can be handled as of its own company. If the command is of its own company, the command conversion block 55 is bypassed.

If the command is not of company A but of company B, the command conversion block 55 converts the company B's OID=".1.3.6.1.4.1.70000.3.8.1.1" analyzed by the command analysis block 54 into an OID=".1.3.6.1.4.1.50000.1.4.2" that indicates set-up item=power ON/OFF of the apparatus #i to be monitored of the company A. The command execution block 56 changes a parameter setting of this apparatus #i to be monitored according to contents of a set-up item=power ON/OFF correlated with the company A's post-conversion OID=".1.3.6.1.4.1.50000.1.4.2".

In an environment where the apparatuses #i to be monitored of both of the companies A and B are thus present in a mixed manner in a remote maintenance system 1, a command defined by company B can be used by company A, thereby making the same settings for the apparatus #i to be monitored of both companies about power ON/OFF setting switching.

Figure 10:
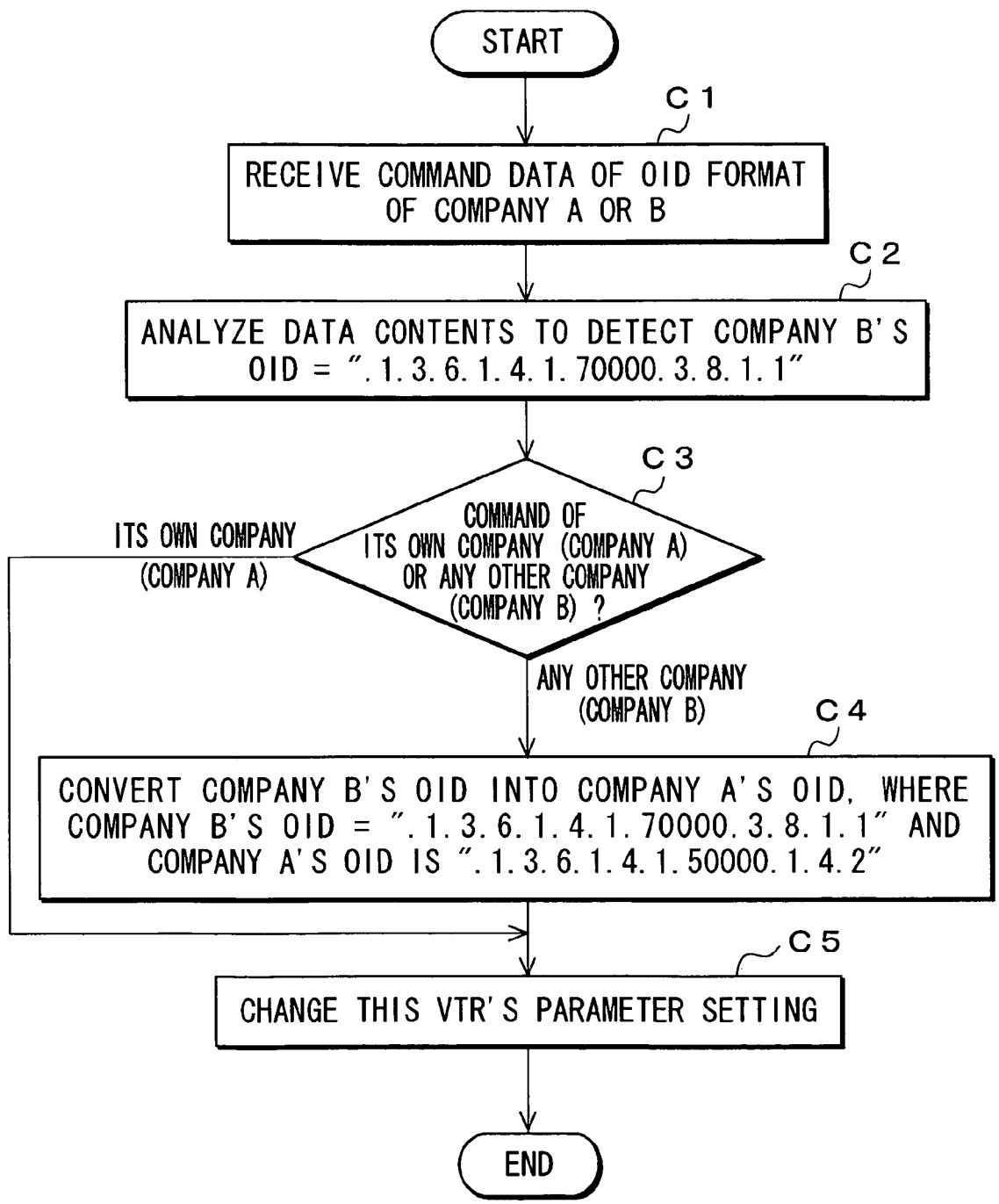
FIG. 10 is a flowchart of a parameter-setting example (OID)

FIG. 10 is a flowchart of a parameter setting example (OID) according to the present embodiment.

In the present embodiment, such a case is assumed that in the remote maintenance system 1 shown in FIG. 1, an OID (parameter identifier ID+ set-up item) is processed which specifies a set-up item of the apparatus #i to be monitored that is connected to a network. The personal computer 103 that sets the parameter(s) and the apparatus #i to be monitored are connected to each other through communication means. In the present embodiment, such an example is enumerated that the apparatus #i to be monitored is a VTR 204. In this embodiment, an OID that indicates a set-up item of a company B's VTR=power ON/OFF is ".1.3.6.1.4.1.70000.3.8.1.1" and an OID that indicates a set-up item of a company A's VTR 204=power ON/OFF is ".1.3.6.1.4.1.50000.1.4.2".

Similarly in the above embodiments, an information management system 100 and a video-editing system 200 shown in FIG. 1 can of course communicate with access points 104 and 201 and, moreover, such communication means as networks 101, 102, and 202 are communication-enabled by control software 301 when a parameter setting is changed.

Under these conditions for parameter-setting processing, at step C1 of the flowchart shown in FIG. 10, the VTR 204 receives the OID-format command data D1 of company A or B placed under the management of the personal computer 103 that sets the parameter(s). In this case, the network I/F section 60 receives and takes in the command data D1 of company B from the network 202 and transfers it through the data bus 70 to the CPU25.

Next, at step C2, the data analysis block 51 receives the command data D1 of company B from the network I/F section 60 and performs analysis processing on contents of the data thereof. In this case, the data analysis block 51 analyzes the command data D1 comprised of a header portion, an OID of company B=".1.3.6.1.4.1.70000.3.8.1.1", data such as an application, and a tailer portion, to extract (detect) the OID of company B=".1.3.6.1.4.1.70000.3.8.1.1" and the data. The data separation/synthesis section 52 removes the header portion and the tailer portion from the command data D1 after data analysis processing, to separate the OID of company B=".1.3.6.1.4.1.70000.3.8.1.1" and the data such as an application from each other.

The miscellaneous block 53 performs processing on the data such as an application separated from the command data D1. For example, similarly in the embodiment shown in FIG. 5, the VTR 204 etc. in which a Web server is installed is supplied with the command data D1 of the HTTP protocol. This command data D1 is handed over to a Web server process and processed there.

At step C3, the command analysis block 54 receives the OID of company B=".1.3.6.1.4.1.70000.3.8.1.1" after data analysis processing and performs command analysis processing thereon. In the command analysis processing, it is decided whether this command data D1 is of its own company (company A) or the other company (company B). For example, if it is decided that the OID does not match the command of its own company, the command is decided to be of company B.

If the command is of any company (company B) other than its own company, the process goes to step C4 where the command conversion block 55 converts the OID of company B=".1.3.6.1.4.1.70000.3.8.1.1" analyzed by the command analysis block 54 into an OID of this VTR 204=".1.3.6.1.4.1.50000.1.4.2". In this parameter conversion, the CPU25 references the command conversion table stored in the EEPROM 23 (see Table 3).

In conversion processing in this embodiment, the OID of this VTR 204 of company A=".1.3.6.1.4.1.50000.1.4.2" is read out by using, as an address, the OID=".1.3.6.1.4.1.70000.3.8.1.1" of company B placed under the remote management of the personal computer 103. In this case, a fact that "company-B-to-company-A" conversion has been performed on the present command is stored in the RAM22 etc. By thus passing the command through the command conversion block 55, it can be handled as that of its own company.

Then, the process goes to step C5 where the command execution block 56 is supplied with the post-conversion command of its own company (company A) from the command conversion block 55. The command execution block 56 of its own company changes a parameter setting of this VTR 204 according to a set-up item=power ON/OFF contents correlated with the post-conversion OID of company A=".1.3.6.1.4.1.50000.1.4.2".

If it is decided at step C3 that the command is of its own company, the command conversion block 55 is bypassed, so that the process goes to step C5. At step C5, the command execution block 56 is supplied with the command of its own company (company A) from the command analysis block 54. The command execution block 56 of its own company changes a parameter setting of this VTR 204 according to adjustment contents of a set-up item correlated with the OID of its own company=".1.3.6.1.4.1.50000.1.4.2".

As described above, according to the present embodiment of the VTR and the information-processing method of the present invention, to process an OID that specifies a parameter identifier ID+set-up item, the command conversion block 55 converts the OID of company B=".1.3.6.1.4.1.70000.3.8.1.1" analyzed by the command analysis block 54 into an OID of this VTR 204 of company A=".1.3.6.1.4.1.50000.1.4.2". The command execution block 56 changes a parameter setting of this VTR 204 according to a set-up item=power ON/OFF contents, which are a set-up item correlated with the post-conversion OID of company A=".1.3.6.1.4.1.50000.1.4.2".

Therefore, even if a type of a VTR of any other company placed under the remote management of the personal computer 103 that sets the parameter(s) is different from that of the VTR 204 of company A, it is possible to easily change a set-up parameter, thereby setting the same set-up item of all the types of apparatuses to the same value. It is thus possible for a person in charge of services or management to mitigate a job of going to a job site and managing and inspecting the monitoring-subject VTRs204 etc. one by one.

Figure 11:
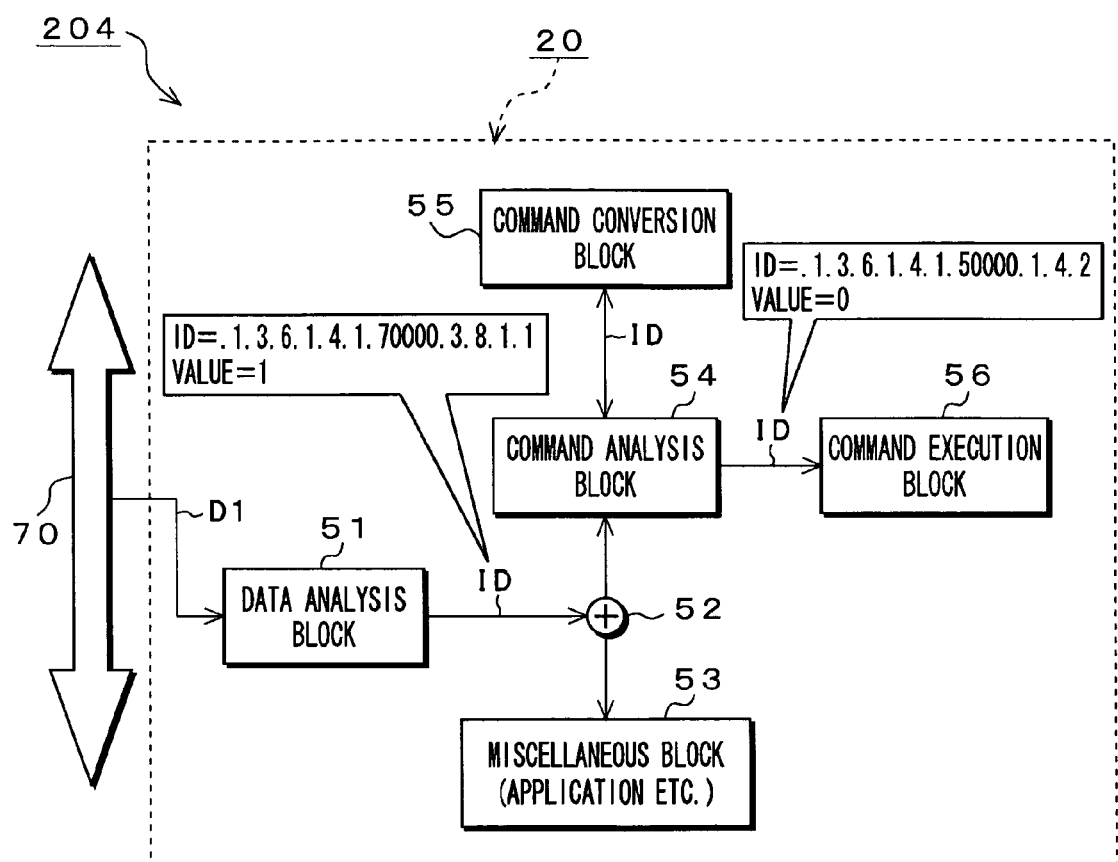
FIG. 11 is a diagram for showing a configuration (OID+ VALUE) of the control block constituted in additional embodiment of the control apparatus 20 according to the invention.

FIG. 11 shows a configuration (OID+VALUE) of a control block constituted in an additional embodiment of control apparatus 20 according to the invention.

In the present embodiment, about power ON/OFF contents, significance of set value is different between companies A and B as shown in Table 4. In this case, a set value (VALUE) is converted.

TABLE 4

| Power ON/OFF value (VALUE) | Company A | Company B |
|---|---|---|
| ON | 1 | 2 |
| OFF | 0 | 1 |

As described in the above embodiments shown in FIGS. 5 and 9, in which a data analysis block 51 shown in FIG. 11 extracts (detects) an OID of company B=".1.3.6.1.4.1.70000.3.8.1.1" that indicates a set-up item=power ON/OFF, whereas in the present embodiment, it detects, for example, VALUE=1, which is a set value that indicates power OFF.

A data separation/synthesis section 52 removes a header portion and a tailer portion from command data D1 after data analysis processing, to output a company B's OID=".1.3.6.1.4.1.70000.3.8.1.1" and VALUE=1 to a command analysis block 54. The command analysis block 54 receives the company B's OID=".1.3.6.1.4.1.70000.3.8.1.1" and VALUE=1 after data analysis processing, to perform command analysis processing thereon. In command analysis processing, it is decided whether the data-analyzed command data D1 is of its own company (company A) or any other company (company B).

According to whether the OID matches a command of its own company, this command analysis block 54 decides whether it is a command of any other company. If the command is of any company (company B) other than its own company, the command conversion block 55 is passed through so that the command can be handled as of its own company. If the command is of its own company, the command conversion block 55 is bypassed as in the case of the above embodiments shown in FIGS. 5 and 9.

If the command is not of company A but of company B, the command conversion block 55 converts the company B's OID=".1.3.6.1.4.1.70000.3.8.1.1" and VALUE=1 analyzed by the command analysis block 54 into an OID=".1.3.6.1.4.1.50000.1.4.2" and value=0 that indicates a set-up item=power ON/OFF of the apparatus #i to be monitored of a company A. A command execution block 56 changes a parameter setting of this apparatus #i to be monitored according to contents of the set-up item=power OFF correlated with the company A's post-conversion OID=".1.3.6.1.4.1.50000.1.4.2" and VALUE=0.

In an environment where the apparatuses #i to be monitored of both of the companies A and B are thus present in a mixed manner in a remote maintenance system 1, a command defined by the company B can be used by the company A, thereby making the same settings for the apparatus #i to be monitored of both of the companies about power ON/OFF setting switching. It is to be noted that if set values are signified such that, for example, set values 0 and 1 indicate OFF and ON respectively in companies A and B, set value (VALUE) conversion is unnecessary.

Figure 12:
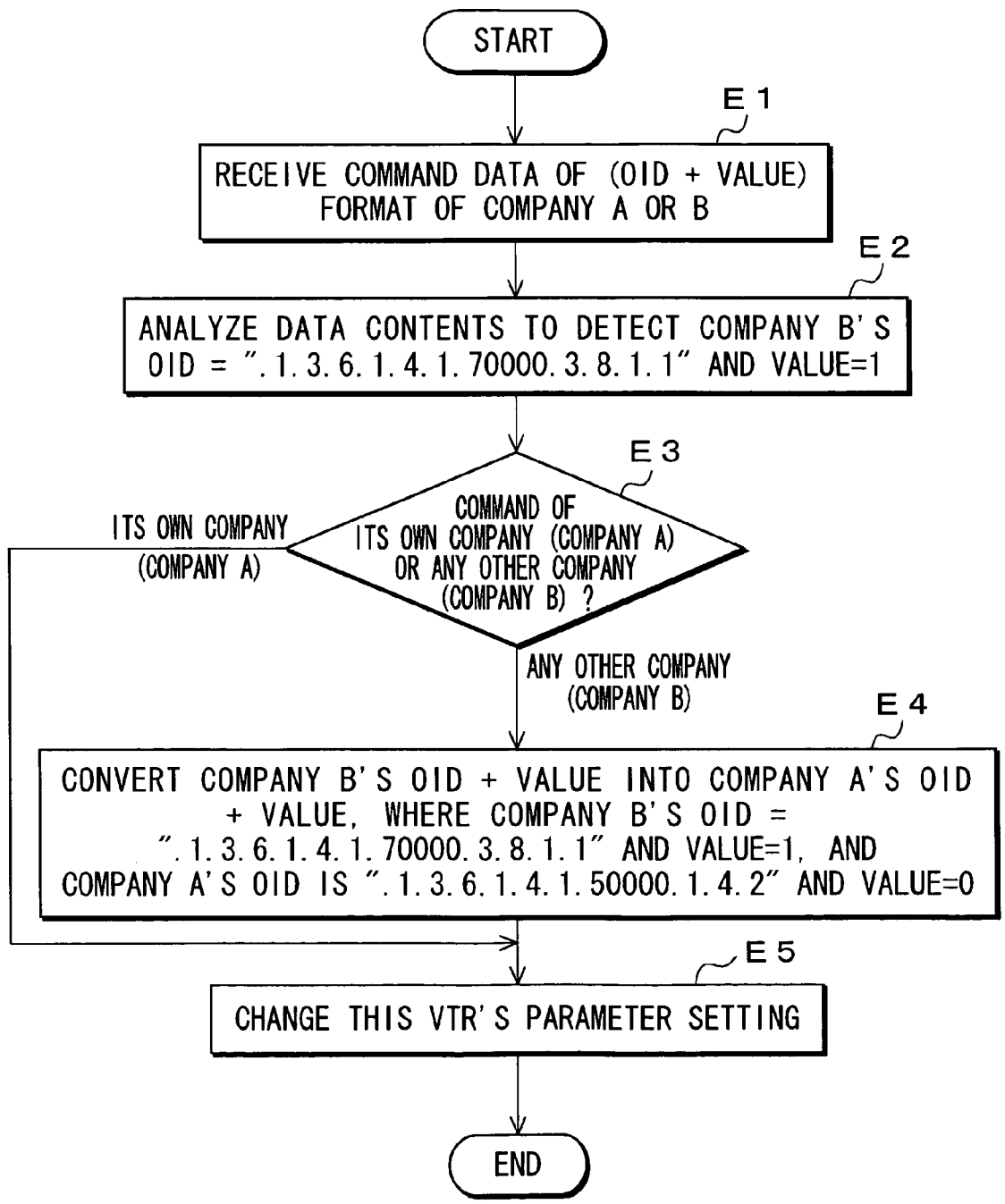
FIG. 12 is a flowchart of a parameter setting example (OID+VALUE)

FIG. 12 is a flowchart of a parameter-setting example (VALUE) according to the present embodiment.

In the present embodiment, such a case is assumed that in the remote maintenance system 1 shown in FIG. 1, an OID (parameter identifier ID+set-up item) and VALUE, which specifies a set-up item of the apparatus #i to be monitored that is connected to a network, are processed. The personal computer 103 that sets the parameter(s) and the apparatus #i to be monitored are connected to each other through communication means. In the present embodiment, such an example is enumerated that the apparatus #i to be monitored is a VTR 204. In this embodiment, such an example is enumerated that an OID of a company B's VTR that indicates set-up item=power ON/OFF is ".1.3.6.1.4.1.70000.3.8.1.1" and a set value that indicates power OFF is VALUE=1 and an OID of a company A's VTR 204 that indicates set-up item=power ON/OFF is ".1.3.6.1.4.1.50000.1.4.2" and a set value that indicates its power OFF is VALUE=0.

An information management system 100 and a video-editing system 200 shown in FIG. 1 can of course communicate with access points 104 and 201 and, moreover, such communication means as networks 101, 102, and 202 are communication-enabled by control software 301 when a parameter setting is changed.

Under these conditions for parameter-setting processing, at step E1 of the flowchart shown in FIG. 12, the VTR 204 receives (OID+VALUE)-format command data D1 of company A or B placed under the management of the personal computer 103 that sets the parameter(s). In this case, a network I/F section 60 receives and takes in the command data D1 of company B from a network 202 and transfers it through a data bus 70 to a CPU 25.

Next, at step E2, a data analysis block 51 receives the command data D1 of company B from the network I/F section 60 and performs analysis processing on contents of the data thereof. In this case, the data analysis block 51 analyzes the command data D1 comprised of a header portion, an OID of company B=".1.3.6.1.4.1.70000.3.8.1.1" and VALUE=1, data such as an application, and a tailer portion, to extract (detect) the OID of company B=".1.3.6.1.4.1.70000.3.8.1.1", VALUE=1 and the data. A data separation/synthesis section 52 removes the header portion and the tailer portion from the command data D1 after data analysis processing, to separate the OID of company B=".1.3.6.1.4.1.70000.3.8.1.1" and VALUE=1 and the data such as an application from each other.

A miscellaneous block 53 performs processing on the data such as an application separated from the command data D1. For example, as in the case of the above embodiment shown in FIG. 5, the VTR 204 etc. in which a web server is installed is supplied with the command data D1 of the HTRP protocol, for example. This command data D1 is handed over to a Web server process and processed there.

At step E3, a command analysis block 54 receives the OID of company B=".1.3.6.1.4.1.70000.3.8.1.1" and VALUE=1 after data analysis processing and performs command analysis processing thereon. In the command analysis processing, it is decided whether this command data D1 is of its own company (company A) or the other company (company B). For example, if it is decided that the OID and the VALUE do not match the command of its own company, the command is decided to be of company B.

If the command is of any company (company B) other than its own company, the process goes to step E4 where a command conversion block 55 converts the OID of company B=".1.3.6.1.4.1.70000.3.8.1.1" and VALUE=1 analyzed by the command analysis block 54 into an OID of this VTR 204=".1.3.6.1.4.1.50000.1.4.2" and VALUE=0. In this parameter conversion, the CPU 25 references the command conversion table stored in an EEPROM 23 (see Table 4).

In conversion processing in this case, the OID of this VTR 204 of company A=".1.3.6.1.4.1.50000.1.4.2" and VALUE=0 is read out by using, as an address, the OID=".1.3.6.1.4.1.70000.3.8.1.1" and VALUE=L of company B placed under the remote management of the personal computer 103. In this case, a fact that "company-B-to-company-A" conversion has been performed on the present command is stored in the RAM 22 etc. By thus passing the command through the command conversion block 55, it can be handled as that of its own company.

Then, the process goes to step E5 where a command execution block 56 is supplied with the post-conversion command of its own company (company A) from the command conversion block 55. The command execution block 56 of its own company changes a parameter setting of this VTR 204 according to contents of a set-up item=power ON/OFF correlated with the post-conversion OID of company A=".1.3.6.1.4.1.50000.1.4.2" and VALUE=0.

If it is decided at step E3 that the command is of its own company, the command conversion block 55 is bypassed, so that the process goes to step E5. At step E5, the command execution block 56 is supplied with the command of its own company (company A) from the command analysis block 54. The command execution block 56 of its own company changes a parameter setting of this VTR 204 according to adjustment contents of a set-up item correlated with the OID of its own company=".1.3.6.1.4.1.50000.1.4.2" and VALUE=0. By thus changing it, it is possible to turn OFF power of the VTR 204 of company A by using a command, which turns OFF power of the VTR 1D of company B.

As described above, according to the present embodiments of the VTR and the information-processing method of the present invention, to process an OID and VALUE that specifies a parameter identifier ID+set-up item, the command conversion block 55 converts the OID of company B=".1.3.6.1.4.1.70000.3.8.1.1" and VALUE=1 analyzed by the command analysis block 54 into an OID of this VTR204 of company A=".1.3.6.1.4.1.50000.1.4.2" and VALUE=0. The command execution block 56 changes a parameter setting of this VTR 204 according to contents of power-OFF, which is a set-up item correlated with the post-conversion OID of company A=".1.3.6.1.4.1.50000.1.4.2".

Therefore, even if a type of a VTR of company B placed under the remote management of the personal computer 103 that sets the parameter(s) is different from that of the VTR 204 of company A and signification of a set value is different between them, it is possible to easily change a set-up parameter, thereby setting the same set-up items of all the types of apparatuses to the same value. It is thus possible for a person in charge of services or management to mitigate a job of going to a job site and managing and inspecting the VTRs 204 etc. to be monitored one by one.

Figure 13:
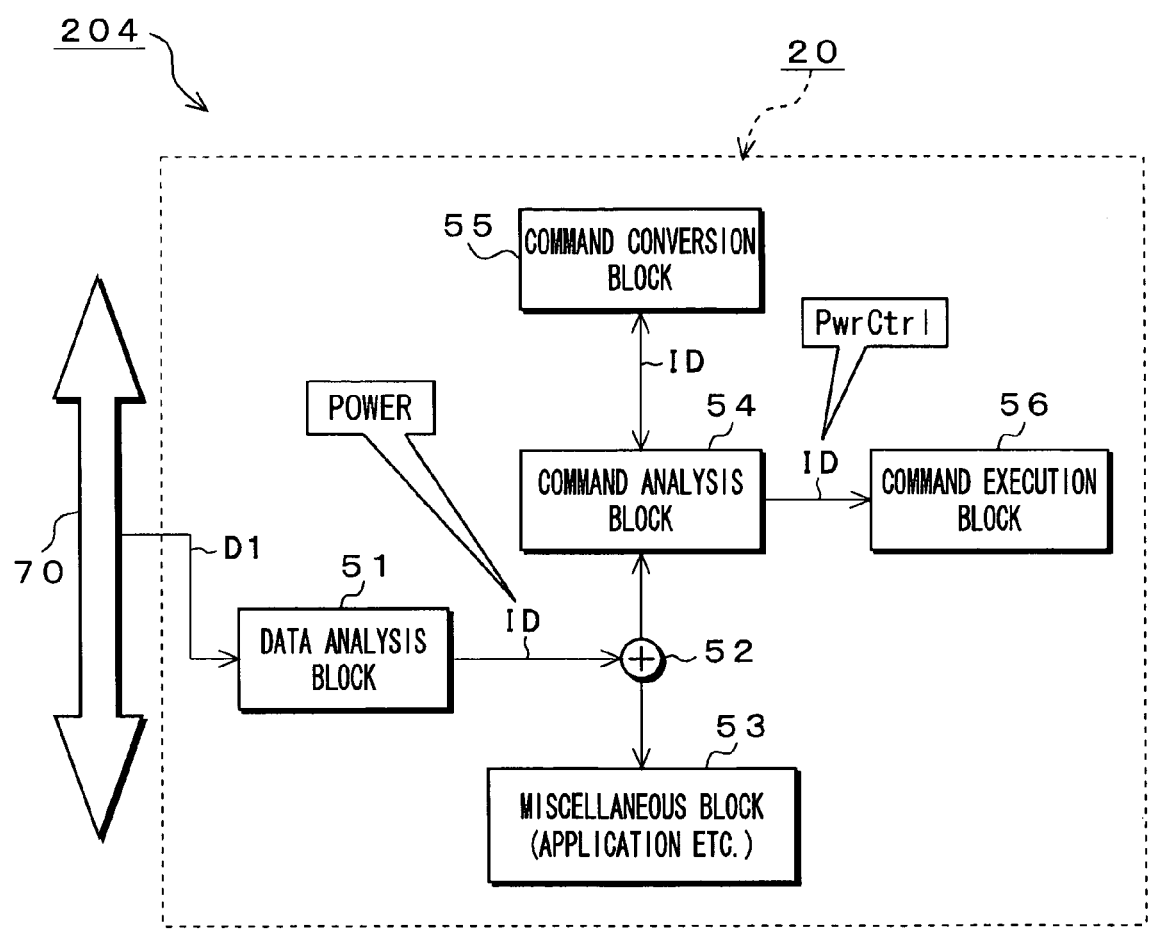
FIG. 13 shows a configuration example (command character string) of the control block constituted in the control apparatus 20 according to a still further embodiment.

FIG. 13 shows a configuration (command character string) of a control block constituted in a still further embodiment of a control apparatus 20 according to the invention.

In the present embodiment, such a case is assumed that a command character string is included in a (parameter identifier ID+data portion) in a certain network protocol and, in terms of power turn-ON/OFF operations, a command character string is different between companies A and B as shown in Table 5. In this case, a command character string is converted.

TABLE 5

| Meaning of object | Command character string of company A | Command character string of company B |
|---|---|---|
| Power turn-ON/OFF | PwrCtrl | POWER |
| Power OFF timer | PwrOffTmr | OFF TIMER |
| Channel switching | ChChg | CHANNEL CONTROL |

A data analysis block 51 shown in FIG. 13 sets a set-up item=power ON/OFF described in the above embodiments shown in FIGS. 5, 9, and 11 by using a command character string. The data analysis block 51 detects a company B's command character string="POWER".

A data separation/synthesis section 52 removes a header portion and a tailer portion from command data D1 after data analysis processing, to output the company B's command character string="POWER" to a command analysis block 54. The command analysis block 54 receives the company B's command character string="POWER" after data analysis processing, to perform command analysis processing thereon. In command analysis processing, it is decided whether the data-analyzed command data D1 is of its own company (company A) or any other company (company B).

According to whether the command character string matches a command of its own company, this command analysis block 54 decides whether it is a command of any other company, etc. In the present embodiment, a command conversion block 55 is provided with a table for conversion of command character strings beforehand. The command conversion block 55 converts commands as in the case of the SNMP, etc.

If the command is of any company (company B) other than its own company, the command conversion block 55 is passed through so that the command can be handled as of its own company. If the command is of its own company, the command conversion block 55 is bypassed as in the case of the above embodiments shown in FIGS. 5 and 9.

If the command is not of company A but of company B, the command conversion block 55 converts the company B's command character string="POWER" analyzed by the command analysis block 54 into a command character string="PwrCtrl" that indicates a set-up item=power OFF/OFF of the apparatus #i to be monitored of the company A. A command execution block 56 changes a parameter setting of this apparatus #i to be monitored according to contents of a set-up item=power OFF correlated with the company A's post-conversion command character string="PwrCtrl". By thus changing the parameter setting, it is possible to switch power ON/OFF for company A's VTR 204 by using a company B-defined command character string that turns OFF a VTR of company B.

In an environment where the apparatuses #i to be monitored of both of the companies A and B are thus present in a mixed manner in a remote maintenance system 1, a command defined by company B can be used by company A, thereby making the same settings for the apparatuses #i to be monitored of both companies about power ON/OFF setting switching.

Figure 14:
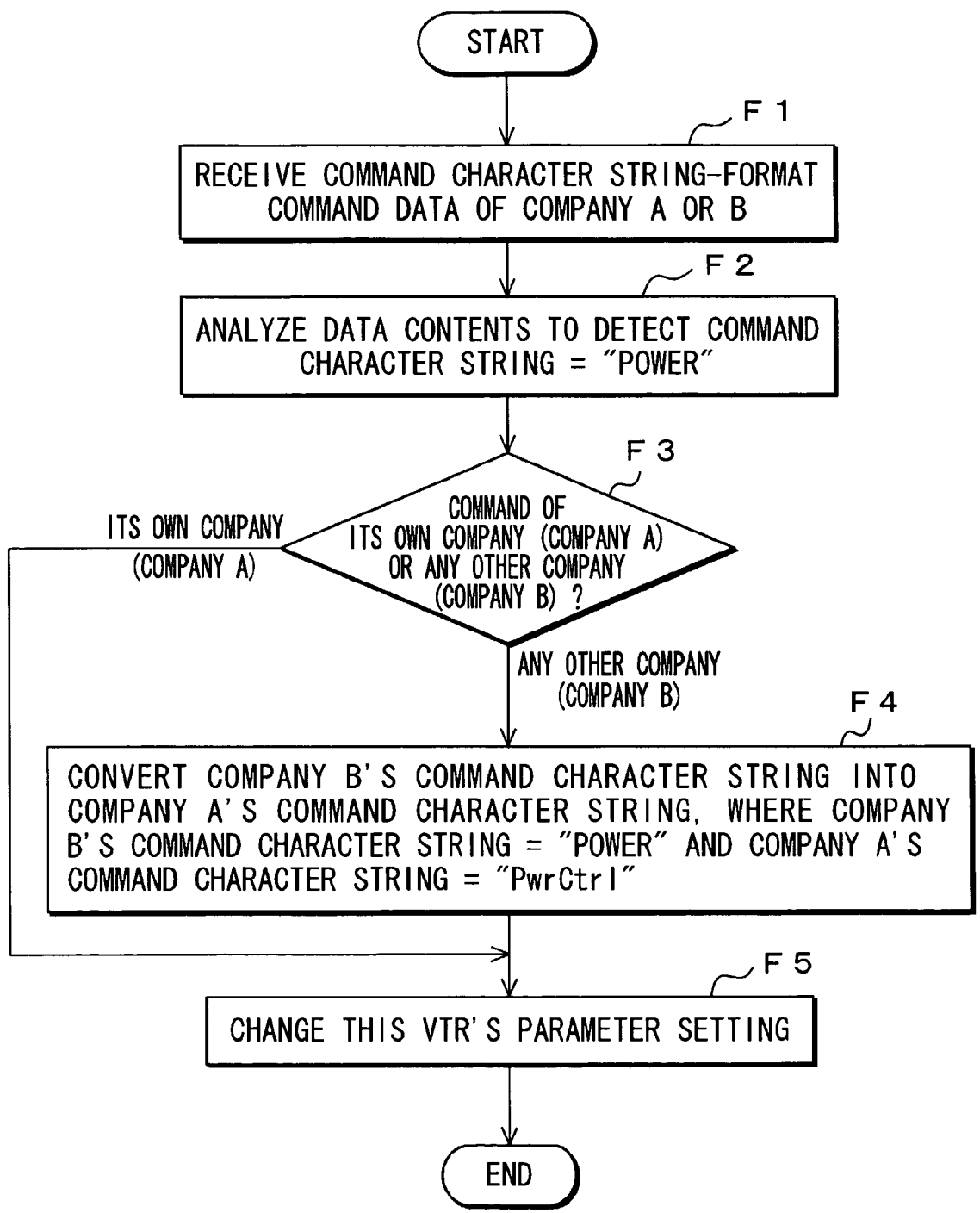
FIG. 14 is a flowchart of a parameter-setting example (command character string)

FIG. 14 is a flowchart of a parameter setting example (command character string) according to the present embodiment.

In the present embodiment, in a case where a command is executed including a command character string in its data portion in a certain network protocol in a remote maintenance system 1 shown in FIG. 1, a table for conversion of command character strings is provided to the command conversion block 55 beforehand so that command conversion can be performed as in the case of the SNMP, etc. the personal computer 103 that sets the parameter(s) and the apparatus #i to be monitored are connected to each other through communication means as in the cases of the above embodiments. In the present embodiment also, such an example is enumerated that the apparatus #i to be monitored is a VTR 204. In the embodiment, a command character string that indicates set-up item=power ON/OFF of a company B's 1D VTR is "POWER" and a command character string that indicates a set-up item=power ON/OFF of company A's VTR 204 is "PwrCtrl".

As described in the above embodiments, an information management system 100 and a video-editing system 200 shown in FIG. 1 can of course communicate with access points 104 and 201 and, moreover, such communication means as networks 101, 102, and 202 are communication-enabled by control software 301 when a parameter setting is changed.

Under these conditions for parameter setting processing, at step F1 of the flowchart shown in FIG. 14, the VTR 204 receives command character string-format command data D1 of company A or B placed under the management of the personal computer 103 that sets the parameter(s). In this case, a network I/F section 60 receives and takes in the command data D1 of company B from a network 202 and transfers it through a data bus 70 to a CPU 25.

Next, at step F2, the data analysis block 51 receives the command data D1 of company B from the network I/F section 60 and performs analysis processing on contents of the data. In this case, the data analysis block 51 analyzes the command data D1 comprised of a header portion, a command character string of company B="POWER", data such as an application, and a tailer portion, to extract (detect) the company B's command character string="POWER" and the data. The data separation/synthesis section 52 removes the header portion and the tailer portion from the command data D1 after data analysis processing, to separate the company B's command character string="POWER" and the data such as an application from each other.

A miscellaneous block 53 performs processing on the data such as an application separated from the command data D1. For example, as in the case of the above embodiments shown in FIGS. 5, 9, and 11, the VTR 204 etc. in which a Web server is installed is supplied with command data D1 of the HTTP protocol, for example. This command data D1 is handed over to a Web server process and processed there.

At step F3, the command analysis block 54 receives the company B's command character string="POWER" after data analysis processing and performs command analysis processing. In the command analysis processing, it is decided whether this command data D1 is of its own company (company A) or the other company (company B). For example, if it is decided that the command character string="POWER" does not match the command of its own company, the command is decided to be of company B, etc.

If the command is of any company (company B) other than its own company, the process goes to step F4 where a command conversion block 55 converts the company B's command character string="POWER" analyzed by the command analysis block 54 into a command character string of this VTR 204="PwrCtrl". In this parameter conversion, the CPU 25 references the command conversion table stored in an EEPROM 23 (see Table 5).

In conversion processing in this case, the command character string of this VTR 204 of company A="PwrCtrl" is read out by using, as an address, the command character string="POWER" of company B placed under the remote management of the personal computer 103. In this case, a fact that "company-B-to-company-A" conversion has been performed on the present command is stored in the RAM 22, etc. By thus passing the command through the command conversion block 55, it can be handled as that of its own company.

Then, the process goes to step F5 where a command execution block 56 is supplied with the post-conversion command of its own company (company A) from the command conversion block 55. The command execution block 56 of its own company changes a parameter setting of this VTR 204 according to contents of a set-up item=power OFF correlated with the company A's post-conversion character string="PwrCtrl".

If it is decided at step F3 that the command is of its own company, the command conversion block 55 is bypassed, so that the process goes to step F5. At step F5, the command execution block 56 is supplied with the command of its own company (company A) from the command analysis block 54. The command execution block 56 of its own company changes a parameter setting of this VTR 204 according to adjustment contents of a set-up item correlated with the command character string of its own company="PwrCtrl". By thus changing it, it is possible to turn ON/OFF power of the VTR 204 of company A by using a company B-defined command character string, which turns OFF power of the VTR of company B.

As described above, according to these embodiments of the VTR and the information-processing method of the present invention, to process a character string that specifies a set-up item, the command conversion block 55 converts the command character string of company B="POWER" analyzed by the command analysis block 54 into a command character string of this VTR 204 of company A="PwrCtrl". The command execution block 56 changes a parameter setting of this VTR 204 according to contents of power-OFF, which is a set-up item correlated with the post-conversion command character string of company A="PwrCtrl".

Therefore, even if a type of a VTR of company B placed under the remote management of the parameter setting personal computer 103 is different from that of the VTR 204 of company A and they have different character strings, it is possible to easily change a set-up parameter, thereby setting the same set-up item of all the types of apparatuses to the same value. It is thus possible for a person in charge of services or management to mitigate a job of going to a job site and managing and inspecting the VTRs 204 etc. to be monitored one by one.

Figure 15:
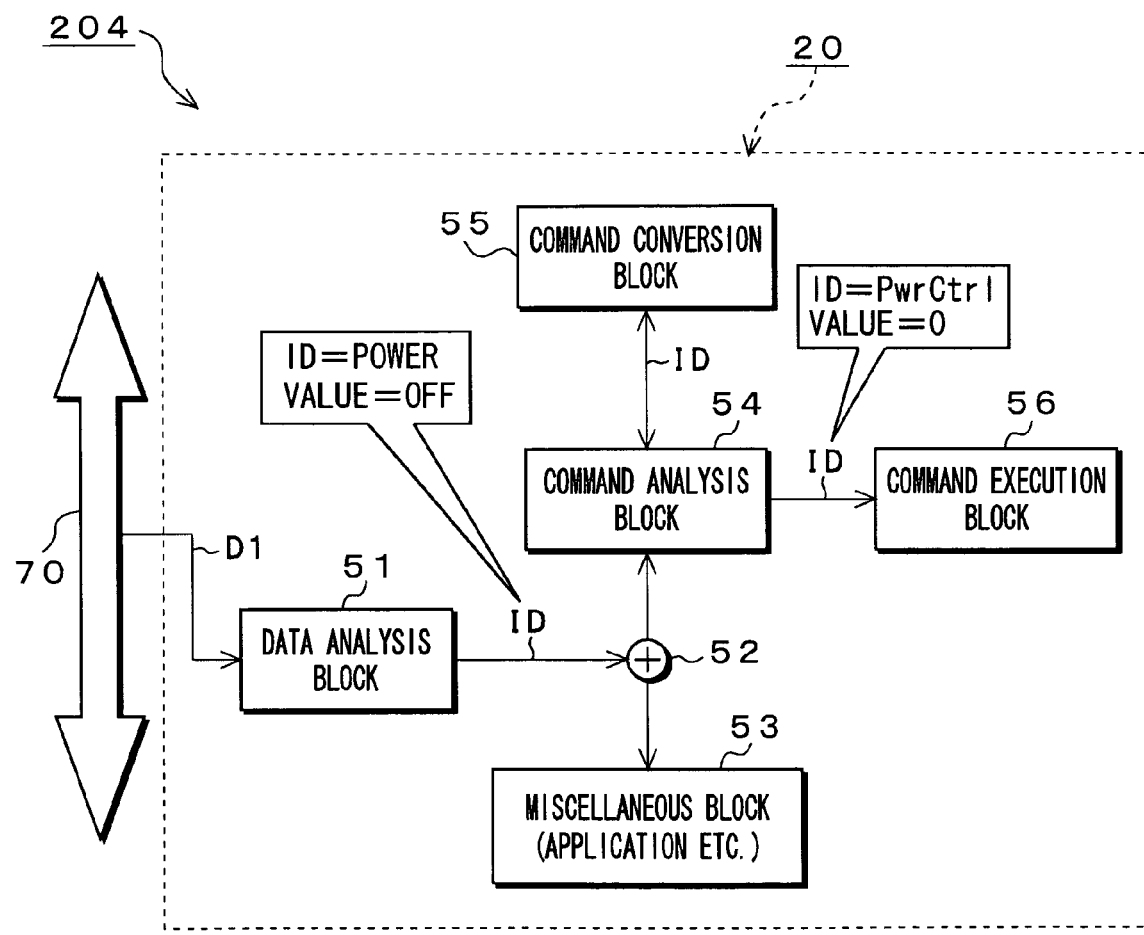
FIG. 15 is a diagram for showing a configuration (command character string+VALUE) of the control block constituted in the control apparatus 20 according to a still additional embodiment.

FIG. 15 shows a configuration (command character string+VALUE) 1D of a control block constituted in still additional embodiment of a control apparatus 20 according to the invention.

In the present embodiment, such a case is assumed that a command character string related to the embodiment shown in FIG. 13 as well as signification of a set value about power ON/OFF are different between companies A and B as shown in Table 6. In this case, a set value (VALUE) is converted.

TABLE 6

| Value of power ON/OFF (VALUE) | Company A | Company B |
|---|---|---|
| ON | 1 | ON |
| OFF | 0 | OFF |

A data analysis block 51 shown in FIG. 15 sets a set-up item=power ON/OFF described in the above embodiments shown in FIGS. 5, 9, and 13, by using a command character string+VALUE. The data analysis block 51 detects a company B's command character string="POWER" and VALUE=OFF that indicates power OFF.

A data separation/synthesis section 52 removes a header portion and a tailer portion from command data D1 after data analysis processing, to output a company B's command character string="POWER" to a command analysis block 54. The command analysis block 54 receives the company B's command character string="POWER" and VALUE=OFF after data analysis processing, to perform command analysis processing thereon. In the command analysis processing, it is decided whether the data-analyzed command data D1 is of its own company (company A) or any other company (company B).

According to whether the command character string and VALUE matches a command of its own company, this command analysis block 54 decides whether it is a command of any other company, etc. In the present embodiment, the command conversion block 55 is provided with a table for conversion of command character strings and VALUE beforehand. The command conversion block 55 converts commands as in the case of the SNMP, etc.

If the command is of any company (company B) other than its own company, the command conversion block 55 is passed through so that the command can be handled as of its own company. If the command is of its own company, the command conversion block 55 is bypassed as in the case of the above embodiments shown in FIGS. 5, 9, and 13.

If the command is not of company A but of company B, the command conversion block 55 converts the company B's command character string="POWER" and VALUE=OFF analyzed by the command analysis block 54 into a command character string="PwrCtrl" and VALUE=0 that indicates a set-up item=power OFF/OFF of the apparatus #i to be monitored of the company A. A command execution block 56 changes a parameter setting of the apparatus #i to be monitored according to contents of a set-up item=power OFF correlated with the company A's post-conversion character string="PwrCtrl" and VALUE=0. By thus changing the parameter setting, it is possible to switch power ON/OFF for company A's VTR 204 by using a company B-defined command character string and VALUE that turns OFF a VTR of company B.

In an environment where the apparatuses #i to be monitored of both of the companies A and B are thus present in a mixed manner in a remote maintenance system 1, a command defined by company B can be used by company A, thereby making the same settings for the apparatus #i to be monitored of both companies about power ON/OFF setting switching.

FIG. 16 is a flowchart of a parameter setting example (command character string+VALUE) according to the present embodiment.

In the present embodiment, in a case where a command is executed including a command character string and VALUE in its data portion in a certain network protocol in a remote maintenance system 1 shown in FIG. 1, a table for conversion of a command character string and VALUE is provided to the command conversion block 55 beforehand so that command conversion can be performed as in the case of the SNMP, etc. The personal computer 103 that sets the parameter(s) and the apparatus #i to be monitored are connected to each other through communication means as in the cases of the above embodiments. In the present embodiment also, such an example is enumerated that the apparatus #i to be monitored is a VTR204. In the embodiment, a command character string that indicates a company B's VTR set-up item=power ON/OFF is "POWER" and a VALUE that indicates power OFF is "OFF" and a command character string that indicates a company A's VR204 set-up item=power ON/OFF is "PwrCtrl" and a VALUE that indicates power OFF is "0".

As described in the above embodiments, an information management system 100 and a video-editing system 200 shown in FIG. 1 can of course communicate with access points 104 and 201 and, moreover, such communication means as networks 101, 102, and 202 are communication-enabled by control software 301 when a parameter setting is changed.

Under these conditions for parameter-setting processing, at step G1 of the flowchart shown in FIG. 16, the VTR 204 receives (command character string+VALUE)-format command data D1 of company A or B placed under the management of the personal computer 103 that sets the parameter(s). In this case, a network I/F section 60 receives and takes in the command data D1 of company B from a network 202 and transfers it through a data bus 70 to a CPU 25.

Next, at step G2, the data analysis block 51 receives the command data D1 of company B from the network I/F section 60 and performs analysis 1D processing on contents of the data. In this case, the data analysis block 51 analyzes the command data D1 comprised of a header portion, a command character string of company B="POWER"+VALUE="OFF", data such as an application, and a tailer portion, to extract (detect) the company B's command character string="POWER"+VALUE="OFF" and the data. The data separation/synthesis section 52 removes the header portion and the tailer portion from the command data D1 after data analysis processing, to separate the company B's command character string="POWER"+VALUE="OFF" and the data such as an application from each other.

A miscellaneous block 53 performs processing on the data such as an application separated from the command data D1. For example, as in the case of the above embodiments shown in FIGS. 5, 9, 11, and 13, the VTR 204 etc. in which a Web server is installed is supplied with command data D1 of the HTTP protocol, for example. This command data D1 is handed over to a Web server process and processed there.

At step G3, the command analysis block 54 receives the company B's command character string="POWER"+VALUE="OFF" after data analysis processing and performs command analysis processing thereon. In the command analysis processing, it is decided whether this command data D1 is of its own company (company A) or the other company (company B). For example, if it is decided that the command character string="POWER"+VALUE="OFF" does not match the command of its own company, the command is decided to be of company B, etc.

If the command is of any company (company B) other than its own company, the process goes to step G4 where the command conversion block 55 converts the company B's command character string="POWER"+VALUE="OFF" analyzed by the command analysis block 54 into a command character string of this VTR 204="PwrCtrl"+VALUE="0". In this parameter conversion, the CPU25 references the command conversion table stored in an EEPROM 23 (see Tables 5 and 6).

In the conversion processing in this case, the command character string of this VTR 204 of company A="PwrCtrl"+VALUE="0" is read out by using, as an address, the command character string="POWER"+VALUE="OFF" of company B placed under the remote management of the personal computer 103. In this case, a fact that "company-B-to-company-A" conversion has been performed on the present command is stored in the RAM22, etc. By thus passing the command through the command conversion block 55, it can be handled as that of its own company.

Then, the process goes to step G5 where the command execution block 56 is supplied with the post-conversion command of its own company (company A) from the command conversion block 55. The command execution block 56 of its own company changes a parameter setting of this VTR 204 according to contents of a set-up item=power OFF correlated with the company A's post-conversion character string="PwrCtrl"+VALUE="0".

If it is decided at step G3 that the command is of its own company, the command conversion block 55 is bypassed, so that the process goes to step G5. At step G5, the command execution block 56 is supplied with the command of its own company (company A) from the command analysis block 54. The command execution block 56 of its own company changes a parameter setting of this VTR 204 according to adjustment contents of a set-up item correlated with the command character string of its own company="PwrCtrl"+VALUE="0". By thus changing it, it is possible to turn ON/OFF power of the VTR 204 of company A by using a company B-defined command character string+VALUE, which turns OFF power of the VTR of company B.

As described above, according to these embodiments of the VTR and the information-processing method of the present invention, to process a character string+VALUE that specifies a set-up item, the command conversion block 55 converts a company B's command character string="POWER"+VALUE="OFF" analyzed by the command analysis block 54 into a command character string="PwrCtrl"+VALUE="0" of this VTR 204 of company A. The command execution block 56 changes a parameter setting of this VTR 204 according to contents of power-OFF, which is a set-up item correlated with the post-conversion command character string of company A="PwrCtrl"+VALUE="0".

Therefore, even if a type of a VTR of company B placed under the remote management of the personal computer 103 that sets the parameter(s) is different from that of the VTR 204 of company A and they have different character strings and set values, it is possible to easily change a set-up parameter, thereby setting the same set-up item of all the types of apparatuses to the same value. It is thus possible for a person in charge of services or management to mitigate a job of going to a job site and managing and inspecting the VTRs 204, etc. to be monitored one by one.

Although the present embodiment has been described in a case where the apparatus #i to be monitored is a VTR, the present invention is not limited to it; it is possible to obtain the same effects also in a case where it is a video camera 106, an IP camera 107, or a printer 108 or 109.

The present invention could well be applied to a remote maintenance system etc. for remotely setting a parameter on a video camera, an IP camera, a printer, a monitor, a TV etc., which are apparatuses to be monitored that are connectable to a network.

Thus have been described the optical connector assemblies that are applied to the devices for optical communication, which are often attached and detached. It should be understood by those skilled in the art that various modifications, combinations, sub-combinations and alternations may occur depending on design requirements and other factors insofar as they are within the scope of the appended claims or the equivalents thereof.

What is claimed is:

1. An information-processing system that processes set-up identification information that specifies a set-up item, the set-up item being an adjustment attribute of a predetermined function of an electronic apparatus connectable to a network, comprising:
    an electronic apparatus that sets a parameter and electronic apparatuses on which the parameter is set are connected to each other; and
    wherein each electronic apparatus on which the parameter is set:
    receives the set-up identification information from the electronic apparatus that sets the parameter, the set-up identification including a parameter identifier corresponding to a particular parameter;
    stores an information conversion table by which the parameter identifier received from the electronic apparatus that sets the parameter is converted into a parameter identifier of the electronic apparatus on which the parameter is set;
    analyzes the set-up identification information thus received;
    determines whether the parameter identifier matches a particular parameter of the electronic apparatus on which the parameter is set;
    converts, when the parameter identifier does not match the particular parameter, the parameter identifier received into a parameter identifier of the electronic apparatus on which the parameter is set, by using as an address the received parameter identifier as an entry in the information conversion table;
    converts the set-up identification information thus analyzed into set-up identification information of the electronic apparatus on which the parameter is set; and
    changes a parameter setting of the electronic apparatus on which the parameter is set on the basis of adjustment contents of the set-up item correlated with the set-up identification information thus converted,
    wherein when the electronic apparatuses on which the parameter is being set are made by the same manufacturer and are of the same category but of different types, a different set-up identifier is assigned to a different parameter that adjusts the same function of the respective apparatus;
    wherein when the electronic apparatuses on which the parameter is being set are made by the same manufacturer and are of the same category and of the same type, the same set-up identifier is assigned to parameters that make the same setting; and
    wherein when the electronic apparatuses on which the parameter is being set are of the same category, a common parameter set-up identifier is assigned to set-up items that adjust the same function of the apparatuses.

2. An electronic apparatus that is connectable to another electronic apparatus that sets a parameter, via a network, and on which a parameter is set by enabling to be processed set-up identification information that specifies a set-up item, the set-up item being an adjustment attribute of a predetermined function of the electronic apparatus, and the electronic apparatus comprising:
    reception means for receiving the set-up identification information from the electronic apparatus that sets the parameter, the set-up identification including a parameter identifier corresponding to a particular parameter;
    storage means for storing an information conversion table by which the parameter identifier received from the electronic apparatus that sets the parameter is converted into a parameter identifier of the electronic apparatus on which the parameter is set;
    analysis means for analyzing the set-up identification information received from the reception means;
    determination means for deteimining whether the parameter identifier matches a particular parameter of the electronic apparatus on which the parameter is set;
    converting means for converting, when the parameter identifier does not match the particular parameter, the parameter identifier received into a parameter identifier of the electronic apparatus on which the parameter is set by using as an address the received parameter identifier as an entry in the information conversion table;

conversion means for converting the set-up identification information analyzed by the analysis means into set-up identification information of this electronic apparatus; and changing means for changing a parameter setting of this electronic apparatus on the basis of adjustment contents of the set-up item correlated with the set-up identification information converted by the conversion means, wherein when a plurality of the electronic apparatuses on which the parameter is being set are made by the same manufacturer and are of the same category but of different types, a different set-up identifier is assigned to a different parameter that adjusts the same function of the respective apparatus;

wherein when a plurality of the electronic apparatuses on which the parameter is being set are made by the same manufacturer and are of the same category and of the same type, the same set-up identifier is assigned to parameters that make the same setting; and wherein when a plurality of the electronic apparatuses on which the parameter is being set are of the same category, a common parameter set-up identifier is assigned to set-up items that adjust the same function of the apparatuses.

3. The electronic apparatus according to claim 2, wherein the conversion means converts the adjustment contents of the set-up item into adjustment contents of this electronic apparatus.

4. The electronic apparatus according to claim 2, comprising storage means for storing a program, the program allowing the electronic apparatus:

to receive the set-up identification information from the electronic apparatus that sets the parameter;

to analyze the set-up identification information thus received;

to convert the set-up identification information thus analyzed into set-up identification information of this electronic apparatus; and to change a parameter setting of this electronic apparatus on the basis of adjustment contents of the set-up item correlated with the set-up identification information thus converted.

5. An electronic apparatus that is connectable to another electronic apparatus that sets parameter, via a network, and on which a parameter is set by enabling to be processed set-up identification information that specifies a set-up item, the set-up item being an adjustment attribute of a predetermined function of the electronic apparatus, and the electronic apparatus comprising:

reception device to receive the set-up identification information from the electronic apparatus that sets the parameter, the set-up identification including a parameter identifier corresponding to a particular parameter;

storage device configured to store an information conversion table by which the parameter identifier received from the electronic apparatus that sets the parameter is converted into a parameter identifier of the electronic apparatus on which the parameter is set;

analysis device to analyze the set-up identification information received from the reception device;

determining device to determine whether the parameter identifier matches a particular parameter of the electronic apparatus on which the parameter is set;

converting device to convert, when the parameter identifier does not match the particular parameter, the parameter identifier received into a parameter identifier of the electronic apparatus on which the parameter is set by using as an address the received parameter identifier as an entry in the information conversion table;

conversion device to convert the set-up identification information analyzed by the analysis device into set-up identification information of this electronic apparatus; and changing device to change a parameter setting of this electronic apparatus on the basis of adjustment contents of the set-up item correlated with the set-up identification information converted by the conversion device, wherein when a plurality of the electronic apparatuses on which the parameter is being set are made by the same manufacturer and are of the same category but of different types, a different set-up identifier is assigned to a different parameter that adjusts the same function of the respective apparatus;

wherein when a plurality of the electronic apparatuses on which the parameter is being set are made by the same manufacturer and are of the same category and of the same type, the same set-up identifier is assigned to parameters that make the same setting; and wherein when a plurality of the electronic apparatuses on which the parameter is being set are of the same category, a common parameter set-up identifier is assigned to set-up items that adjust the same function of the apparatuses.

6. An information-processing method for processing set-up identification information that specifies a set-up item, the set-up item being an adjustment attribute of a predetermined function of an electronic apparatus connectable to a network, the method comprising the steps of:

connecting an electronic apparatus that sets a parameter and an electronic apparatus on which the parameter is set to each other;

receiving the set-up identification information from the electronic apparatus that sets the parameter in the electronic apparatus on which the parameter is set, the set-up identification including a parameter identifier corresponding to a particular parameter;

storing an information conversion table by which the parameter identifier received from the electronic apparatus that sets the parameter is converted into a parameter identifier of the electronic apparatus on which the parameter is set;

analyzing the set-up identification information received in the electronic apparatus on which the parameter is set;

determining whether the parameter identifier matches a particular parameter of the electronic apparatus on which the parameter is set;

converting, when the parameter identifier does not match the particular parameter, the parameter identifier received into a parameter identifier of the electronic apparatus on which the parameter is set by using as an address the received parameter identifier as an entry in the information conversion table;

converting the set-up identification information thus analyzed into set-up identification information of the electronic apparatus on which the parameter is set; and changing a parameter setting of the electronic apparatus on which the parameter is set on the basis of adjustment contents of the set-up item correlated with the set-up identification information thus converted, wherein when a plurality of the electronic apparatuses on which the parameter is being set are made by the same manufacturer and are of the same category but are of different types, a different set-up identifier is assigned to a different parameter that adjusts the same function of the respective electronic apparatus, wherein when a plurality of the electronic apparatuses on which the parameter is being set are made by the same manufacturer and are of the same category and of the same type, the same set-up identifier is assigned to parameters that make the same setting; and wherein when a plurality of the electronic apparatuses on which the parameter is being set are of the same category, a common parameter set-up identifier is assigned to set-up items that adjust the same function of the apparatuses.

* * * * *